US005621501A

United States Patent [19]

Matsuo et al.

[11] Patent Number: 5,621,501

[45] Date of Patent: Apr. 15, 1997

[54] OPENING-CLOSING MECHANISM FOR AN AUTOMATIC ORIGINAL FEEDING APPARATUS

[75] Inventors: Kazuhiro Matsuo, Tokyo; Noriyoshi Ueda; Masakazu Hiroi, both of Yokohama; Tomohito Nakagawa, Matsudo; Wataru Kawata, Tokyo, all of Japan

[73] Assignee: Canon Kabushiki Kaisha, Tokyo, Japan

[21] Appl. No.: 326,969

[22] Filed: Oct. 21, 1994

[30] Foreign Application Priority Data

| | | | |
|---|---|---|---|
| Oct. 25, 1993 | [JP] | Japan | 5-266351 |
| Oct. 29, 1993 | [JP] | Japan | 5-272109 |

[51] Int. Cl.[6] ..... G03B 27/62

[52] U.S. Cl. ..... 355/75

[58] Field of Search ..... 355/230, 231, 355/75

[56] References Cited

U.S. PATENT DOCUMENTS

| | | | |
|---|---|---|---|
| 3,642,376 | 2/1972 | Halvorsen et al. | 355/128 |
| 3,994,582 | 11/1976 | Goshimo et al. | 355/75 |
| 4,124,296 | 11/1978 | Kishi et al. | 355/75 |
| 4,135,805 | 1/1979 | Taylor et al. | 355/75 X |
| 4,365,893 | 12/1982 | Kimura et al. | 355/75 |
| 4,530,598 | 7/1985 | Kajita et al. | 355/75 |
| 4,544,148 | 10/1985 | Kitajima et al. | 271/3.1 |
| 4,853,750 | 8/1989 | Murata et al. | 355/75 |
| 5,003,347 | 3/1991 | Kameda | 355/75 |
| 5,126,787 | 6/1992 | Irie et al. | 355/75 |
| 5,181,705 | 1/1993 | Ueda et al. | 271/3 |
| 5,351,112 | 9/1994 | Naito et al. | 355/233 |

*Primary Examiner*—Fred L. Braun

*Attorney, Agent, or Firm*—Fitzpatrick, Cella, Harper & Scinto

[57] ABSTRACT

An original pressing device for use in a reading apparatus. There is a hinge together with a pressing unit supported pivotably by the hinge and pivoting between a closing position where an original on a platen is pressed and an opening position where the original is released. A coil spring is compressed with the closing operation of the pressing unit and is released from the compression along with the opening operation of the pressing unit, and a fluid damper is arranged within a hollow portion of the coil spring to provide a resistance force when the pressing unit performs the closing operation.

20 Claims, 18 Drawing Sheets

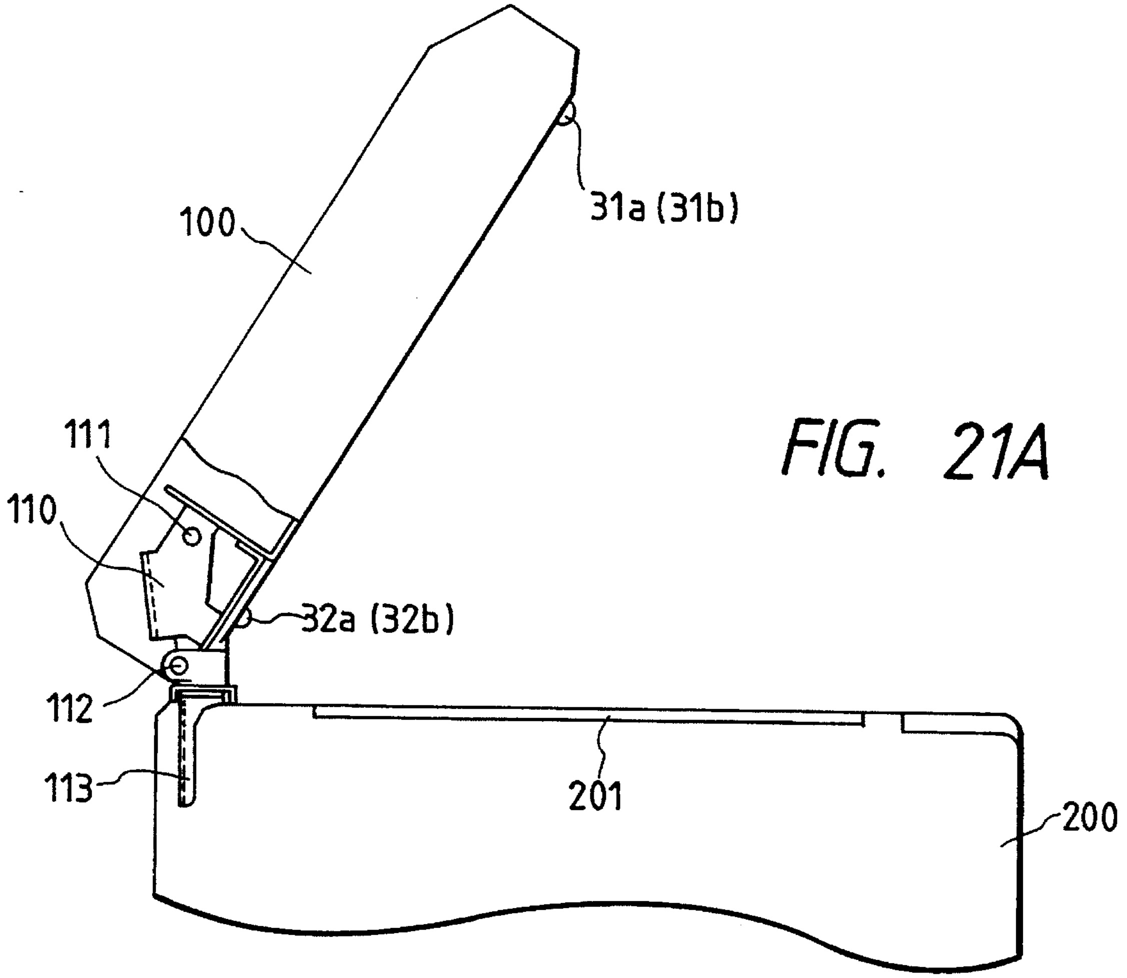
FIG. 21A
FIG. 21B
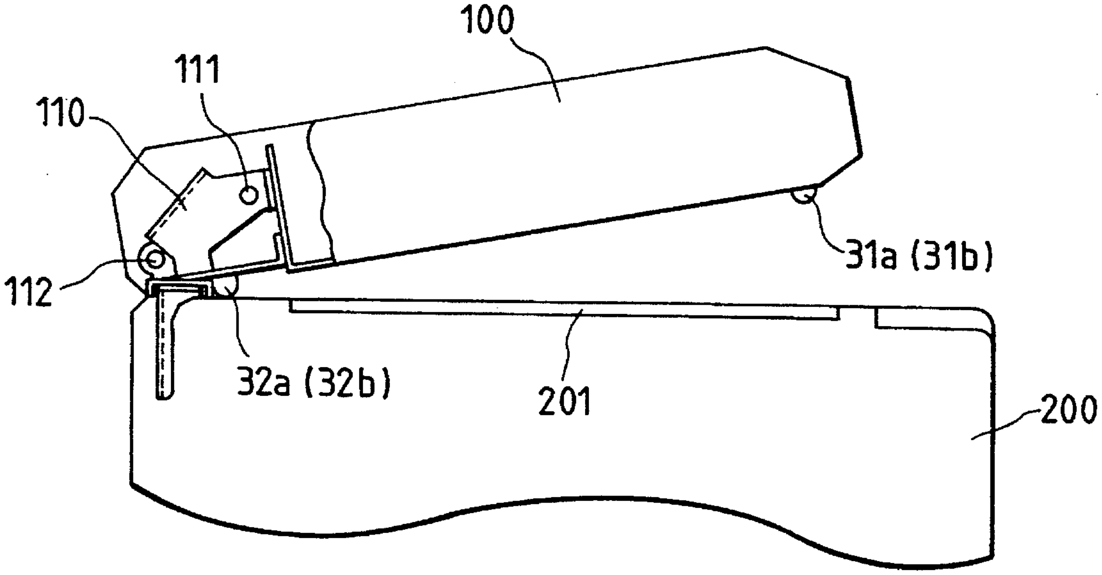

CLOSING (0°)

OPENING

OPENING (20°)

OPENING (40°)

OPENING (60°)

OPENING-CLOSING MECHANISM FOR AN AUTOMATIC ORIGINAL FEEDING APPARATUS

BACKGROUND OF THE INVENTION

1. Field of the Invention

This invention relates to an opening-closing mechanism by which an automatic original feeding apparatus for a copier or the like for automatically placing or discharging an original onto or from a platen is opened and closed relative to the platen.

This invention also relates to an opening-closing mechanism for an original pressing plate for pressing an original placed on the original supporting table of an original reading apparatus.

2. Related Background Art

When an original is to be copied in a copying apparatus having an automatic original feeding apparatus mounted thereon, the original can be automatically copied by using the automatic original feeding apparatus or the original can be manually placed at a predetermined position and copied without using the automatic original feeding apparatus.

That is, when an automatic original feeding apparatus is used, a desired original is placed on the original tray 22 of an automatic original feeding apparatus 21 as shown, for example, in FIG. 10 of of the accompanying drawings, and when the start key 30 of a copying apparatus 20 is depressed, the original is automatically conveyed to and placed on the platen glass 23 of the copying apparatus which is a portion for reading an image, by a white belt 25 or the like, and when the original is stopped at a predetermined position, the optical system (not shown) of the copying apparatus 20 scans the original, whereby image formation is effected. When the reading of the image of the original is terminated, the original is discharged from the platen glass by the white belt 25 and is again placed on the original tray 22. A series of these operations will be automatically performed if the automatic original feeding apparatus is used.

On the other hand, when the automatic original feeding apparatus is not used and an original is to be manually placed on the platen glass 23, the automatic original feeding apparatus is opened in such a manner as to be raised in a direction away from the platen glass 23 as shown in FIG. 11 of the accompanying drawings, and the original is placed at a predetermined position on the platen glass, and then the automatic original feeding apparatus 21 is closed from above so that the surface of the original may be brought as close as possible to the platen glass 23, whereafter the start key 30 of the copying apparatus 20 is depressed to thereby effect image formation.

As shown, an opening-closing device (hinge) 24 for enabling the automatic original feeding apparatus 21 to be opened and closed is mounted on the automatic original feeding apparatus 21, and a spring for biasing the automatic original feeding apparatus in an opening direction is disposed in the hinge so that the automatic original feeding apparatus 21 can be easily opened particularly when it is to be opened in a raising direction, and thus the weighty automatic original feeding apparatus 21 can be raised smoothly. Also when the automatic original feeding apparatus is to be closed, the dropping speed of the automatic original feeding apparatus by its gravity may be suppressed to some extent by the action of the above-described spring so that the automatic original feeding apparatus may quietly land on the platen glass 23.

In the above-described example of the prior art, however, the automatic original feeding apparatus, as is well known, has disposed therein a conveying roller, a discharge roller, a paper guide, a driving motor, etc., all not shown, for automatically feeding and placing the original on the original tray onto a predetermined position on the platen, and discharging the original from the platen and again placing the original onto the original tray upon completion of the copying operation of the copying apparatus and therefore, it is considerably weighty and thus, much load is applied to the spring for biasing the automatic original feeding apparatus in the raising direction. Particularly, when the automatic original feeding apparatus is used for a long time, the ability of the spring is reduced and the spring becomes unable to provide its original spring force, and this has led to the disadvantage that when the automatic original feeding apparatus is closed, the dropping speed thereof increases and the apparatus is damaged or the platen glass is damaged by the shock when the apparatus lands on the platen glass.

Also, there has been the disadvantage that even though the ability of the spring of the hinge is not reduced, when a user forcibly closes the automatic original feeding apparatus, the apparatus is damaged by the shock when it lands on the platen glass.

Also, depending on an image forming apparatus, use is made of an image forming apparatus provided in advance with only an automatic original feeding apparatus for automatically feeding an original to the original supporting table of the image forming apparatus in order to enhance the efficiency of the copying work when a plurality of original sheets are to be copied. Also, there are known an image forming apparatus and an automatic original feeding apparatus for constructing the automatic original feeding apparatus mountably on the image forming apparatus later in order to achieve the high efficiency of the copying work for a user who has bought only the image forming apparatus.

However, with an apparatus of a construction in which a user having an image forming apparatus in advance mounts an automatic original feeding apparatus later on the image forming apparatus or a serviceman assembles an automatic original feeding apparatus to the image forming apparatus at the user's, it is difficult to align the original supporting table of the image forming apparatus and the automatic original feeding apparatus with each other in order to ensure the stable conveyance of originals, and this has led to the disadvantage that the serviceman requires much time and labor to mount the automatic original feeding apparatus on the image forming apparatus.

SUMMARY OF THE INVENTION

The present invention has as its object the provision of an opening-closing mechanism for an automatic original feeding apparatus which can lessen the shock when the automatic original feeding apparatus is closed and can prevent the apparatus from being damaged.

The construction of the opening-closing mechanism for the automatic original feeding apparatus according to the present invention for achieving the above object is characterized by pressing means supported openably and closably relative to an original supporting table and for pressing an original placed on the original supporting table, and shock absorbing means for giving resistance to the motion of said pressing means in a closing direction.

Also, the opening-closing mechanism for the automatic original feeding apparatus according to the present invention wherein an original is automatically fed to an original supporting table provided on the upper surface of an image forming apparatus body when the automatic original feeding apparatus is closed is characterized by a first pivotal fulcrum adapted to pivotally move from the upper surface of the image forming apparatus to thereby open or close the automatic original feeding apparatus, and a second pivotal fulcrum for holding the automatic original feeding apparatus substantially in parallelism to the upper surface of the image forming apparatus.

Accordingly, when the automatic original feeding apparatus of the present invention is mounted on the image forming apparatus, the automatic original feeding apparatus first pivotally moves about the first pivotal fulcrum until one leg portion of the support member of the automatic original feeding apparatus touches down on the upper surface of the image forming apparatus when the automatic original feeding apparatus is closed relative to the image forming apparatus, and then the automatic original feeding apparatus pivotally moves about the second pivotal fulcrum substantially in parallelism to the upper surface of the image forming apparatus and the other leg portion touches down on the upper surface of the image forming apparatus. In this manner, the automatic original feeding apparatus is mounted by means of the support member having two pivotal fulcrums and therefore, even if the positional relationship between the image forming apparatus and the automatic original feeding apparatus in the direction of height somewhat deviates, the automatic original feeding apparatus can maintain itself along the upper surface of the image forming apparatus and thus, stable conveyance of the original becomes possible.

Also, the inner touchdown leg of the automatic original feeding apparatus is provided on the inner side with respect to the second pivotally moved position of the support member, whereby even when that leg touches down earlier than the front side leg due to an external force, the second pivotal fulcrum and the inner touchdown leg do not stretch against each other and pivotally move substantially in parallelism to each other, and the other leg portion can also land on the upper surface of the image forming apparatus. Accordingly, no special adjustment is necessary when a service installs the apparatus and the time and labor required for the installation can be decreased.

BRIEF DESCRIPTION OF THE DRAWINGS

FIGS. 21A and 21B illustrate the operation of the apparatus of FIG. 12.

DETAILED DESCRIPTION OF THE PREFERRED EMBODIMENTS

First Embodiment

Figure 10:
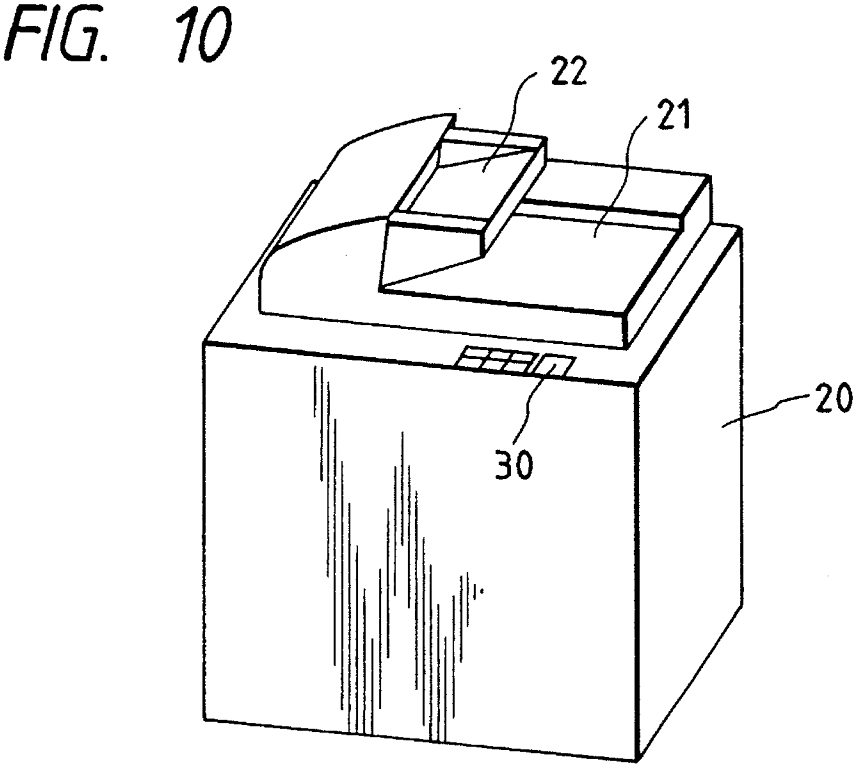
FIG. 10 is a perspective view showing a copying apparatus equipped with the automatic original feeding apparatus embodying the present invention.

The present invention relates to an opening-closing mechanism (hinge) for an automatic original feeding apparatus, and can use a well-known apparatus as the automatic original feeding apparatus. That is, the automatic original feeding apparatus can separate a plurality of originals placed on an original tray 22 as shown in FIG. 10 one by one, feed the original to the platen glass 23 of a copying apparatus body for reading the image of the original, stop the original at a predetermined position conforming to the size thereof, discharge the original from the platen and again place it on the original tray 22, and has incorporated therein a conveying path for effecting those operations, means for driving a conveying roller, a control device, etc.

The opening-closing mechansim (hinge) 24 for the automatic original feeding apparatus which is a feature of the present invention will hereinafter be described with reference to the drawings.

Figure 1:
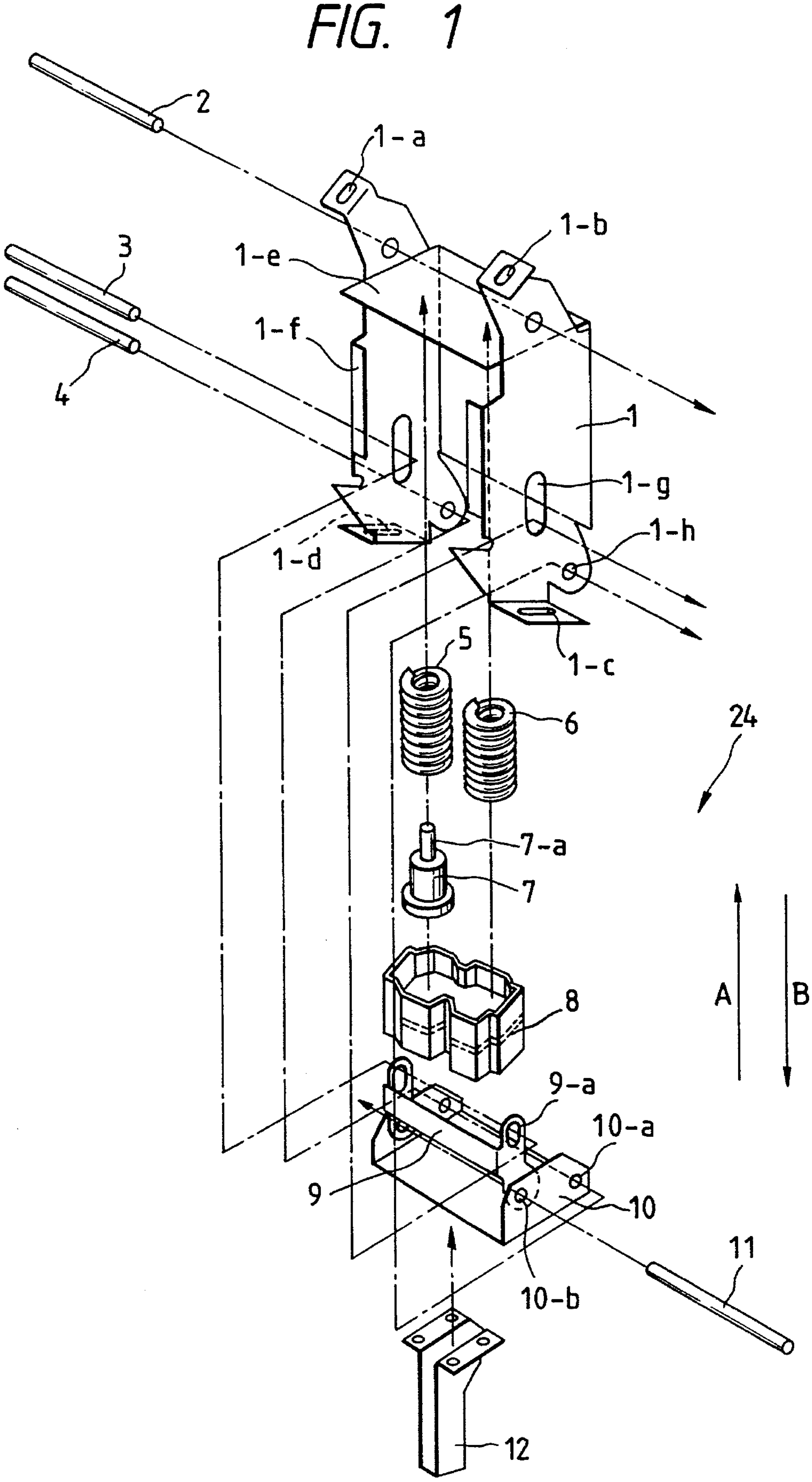
FIG. 1 is a perspective view showing the constituents of an opening-closing mechanism for an automatic original feeding apparatus embodying the present invention.

FIG. 1 is a drawing which represents the feature of the present invention best, and is a perspective view showing parts constituting the opening-closing mechanism (hinge) 24.

The reference numeral 1 designates a hinge frame which is also the framework of the hinge.

The reference numeral 2 denotes a back-up shaft for preventing the bent portion 1-e of the hinge frame 1 for fixing compression coil springs 5 and 6 from being deformed by a spring force.

The reference numeral 3 designates a slider shaft mounted in the slot portion 9-a of an arm 9 and movable so as to be guided by the slot portion 1-g of the hinge frame 1 and bearing against and supporting the lower portion of a slider 8.

The reference numeral 4 denotes a hinge shaft mounted in the aperture portion 1-h of the hinge frame 1 and the aperture portion 10-a of a hinge base and which is the center of pivotal movement of the hinge (hinge frame 1).

The reference numerals 5 and 6 designate compression springs disposed within the hinge frame 1 and acted on by the movement of the slider 8.

The reference numeral 7 denotes an oil damper disposed between the slider 8 and the compression spring 5 and located in such a manner that a portion thereof comes into the compression spring 5.

The slider 8 is guided by the bent portion 1-f of the hinge frame 1 and is movable in the directions of arrows A and B and has its lower portion supported by the slider shaft 3 under the action of the compression springs 5 and 6.

The arm 9 is pivotally movable about an arm shaft 11 mounted with respect to the hinge base 10 and on the other hand, it supports the slider shaft 3 mounted thereon.

A support post 12 is fixed to the hinge base 10 by a screw or the like and the lower end portion thereof is inserted into the bushing (not shown) or the like of a copying apparatus body.

Figure 11:
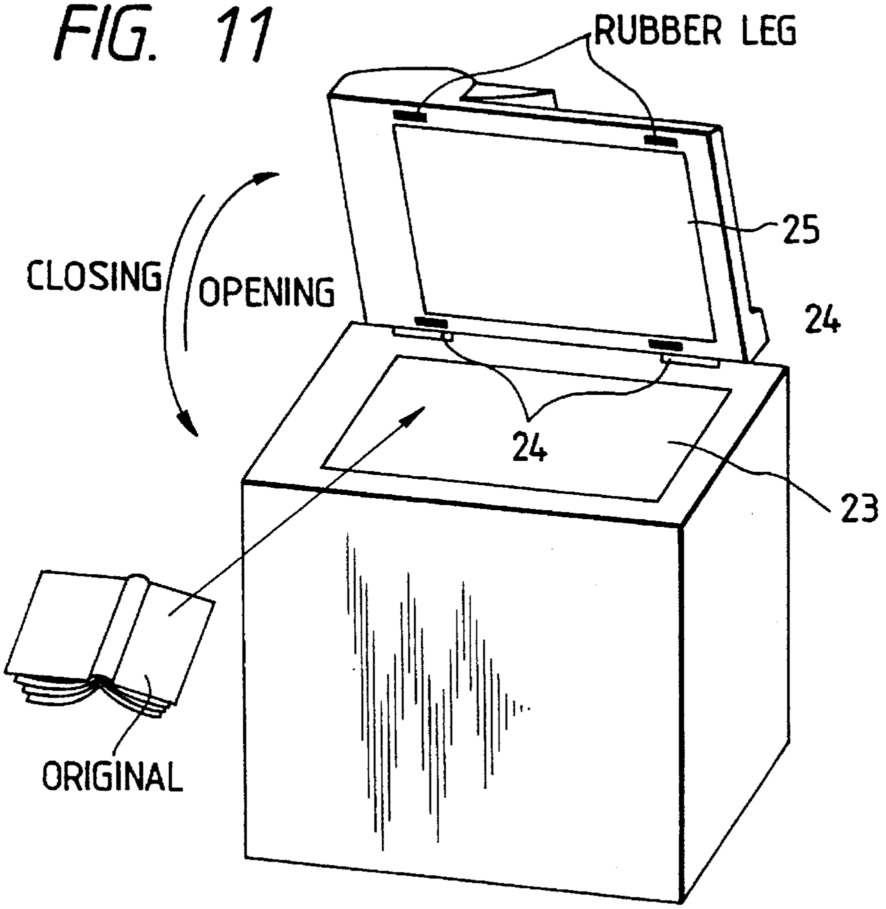
FIG. 11 is a perspective view showing the copying apparatus when the automatic original feeding apparatus embodying the present invention is opened.

The hinge 24 thus constructed is provided on each of the right and left sides of the inner part of the automatic original feeding apparatus, as shown in FIG. 11.

The right and left hinges keep balance therebetween by using compression springs of different spring forces within the hinges, depending on the centroidal position of the automatic original feeding apparatus, but basically are of the same construction.

Figure 2:
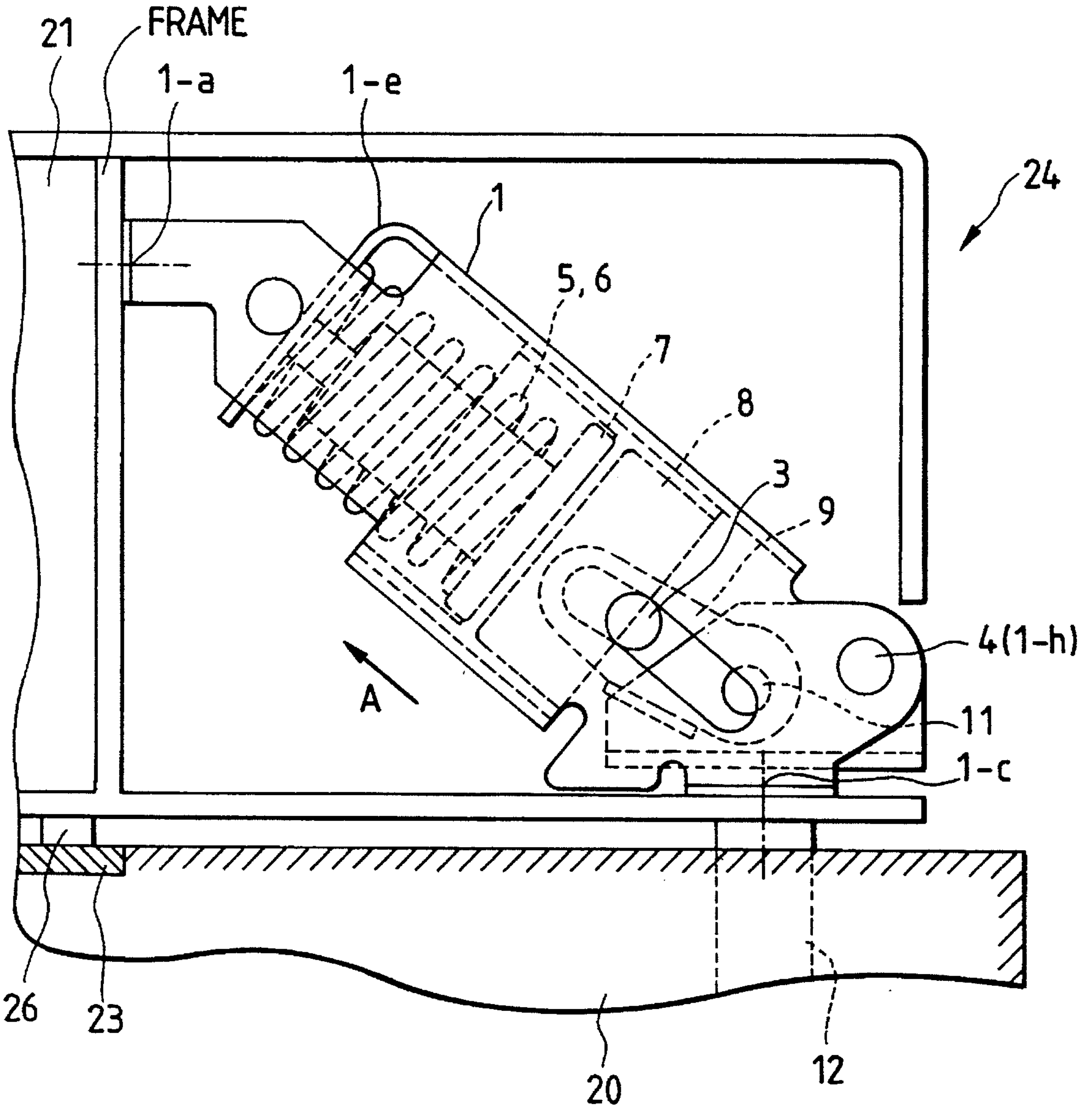
FIG. 2 is a side view when the opening-closing mechanism for the automatic original feeding apparatus embodying the present invention is closed.

FIG. 2 is a side view of the hinge 24 provided on the automatic original feeding apparatus, and shows the hinge when the automatic original feeding apparatus is pressed (closed) against the platen glass 23 of the copying apparatus. A rubber leg 26 provided in the automatic original feeding apparatus bears against the platen glass 23 of the copying apparatus body 20, and the positional relationship between the copying apparatus (the platen glass 23) and the automatic original feeding apparatus (in the direction of height) is ensured by the rubber leg 26. A rubber leg (not shown) is also provided on this side of the automatic original feeding apparatus and bears against the platen glass.

Figure 3:
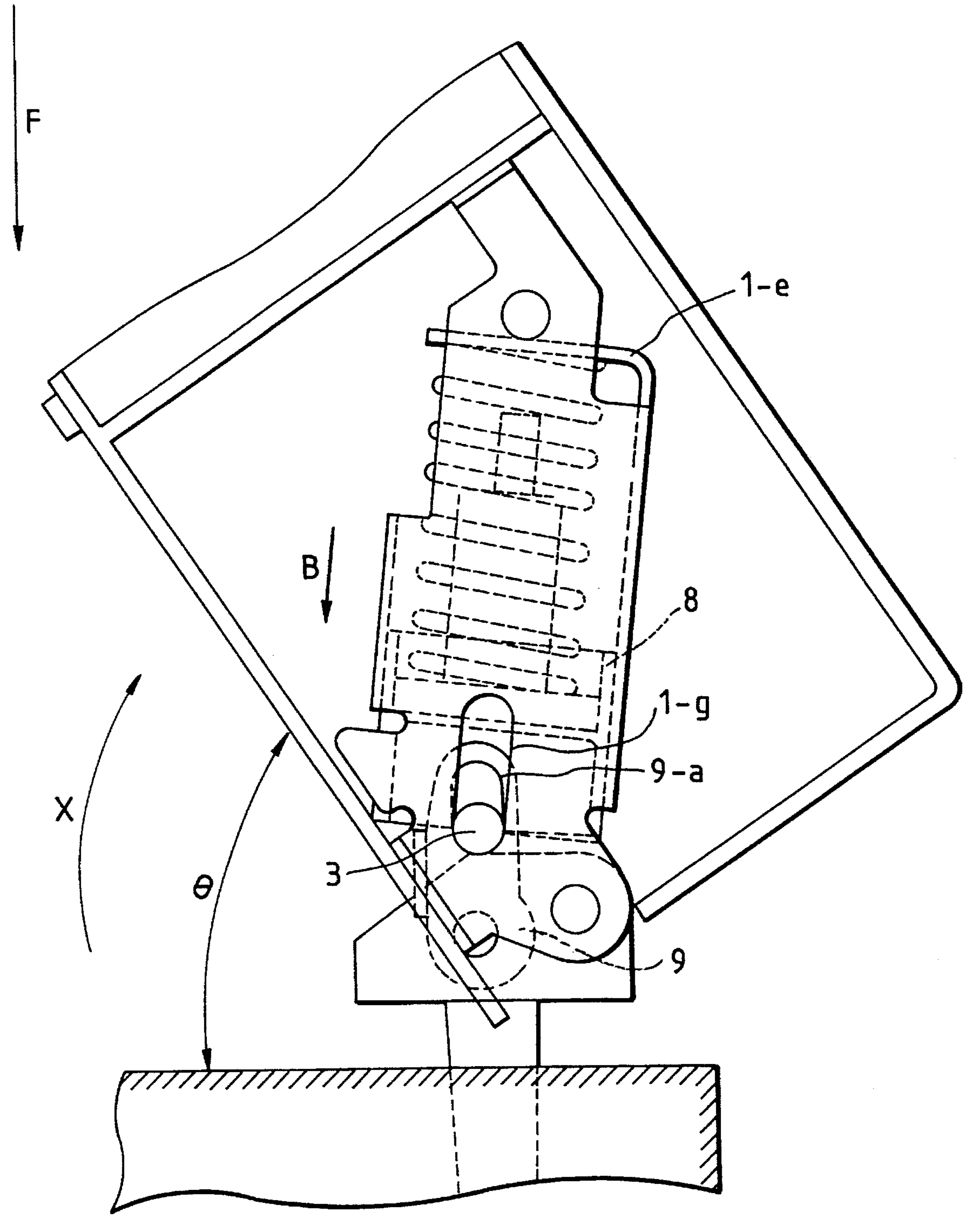
FIG. 3 is a side view when the opening-closing mechanism for the automatic original feeding apparatus embodying the present invention is opened.

Since the hinge frame 1 is fixed to the frame of the automatic original feeding apparatus at 1-a and 1-c by screws or the like, the automatic original feeding apparatus is opened and closed about the hinge shaft 4 which is the pivot axis of the above-described hinge (in FIG. 3, the automatic original feeding apparatus is shown in its opened state).

The state shown in FIG. 2 is a state in which the slider shaft 3 has most pushed up the slider 8 (dotted line) in the direction of arrow A and the compression springs 5 and 6 are most compressed and bring their spring forces into fullest play. These spring forces are transmitted from the slider 8 to the slider shaft 3, the arm 9 and the arm shaft 11 and act as a moment about the hinge shaft 4. That is, the spring forces act in a direction to raise the automatic original feeding apparatus in the direction of arrow X indicated in FIG. 3. The moment force in the direction of arrow X in FIG. 2 can maintain the state of FIG. 2 because the spring forces are set to a level smaller than the dropping force (F in the figure) by the gravity of the automatic original feeding apparatus, and it never happens that the state of FIG. 2 naturally shifts to the state of FIG. 3.

That is, to bring the automatic original feeding apparatus from the state of FIG. 2 into the state of FIG. 3, a user raises the automatic original feeding apparatus, and the moment force in the direction of arrow X by the above-described spring forces is for lightening the force for the user to raise (open) the automatic original feeding apparatus.

In the state of FIG. 3, the opening-closing angle θ is 55° and the slider 8 (dotted line) has been most moved in the direction of arrow B and the slider shaft 3 is located at the end of the slot portion 1-g of the hinge frame 1 and therefore, the compression springs 5 and 6 do not act (stretch) any further. When the automatic original feeding apparatus is to be opened any further, the apparatus can be opened by an amount by which the slider shaft 3 can move in the slot portion 9-a of the arm (to a position in which θ=90°), but in that area, the compression springs 5 and 6 are already locked and therefore, their spring forces do not work.

The above-described construction is the general construction of the hinge, and the operation of the damper 7 which is the greatest feature of the present invention will hereinafter be described in detail.

Figure 4:
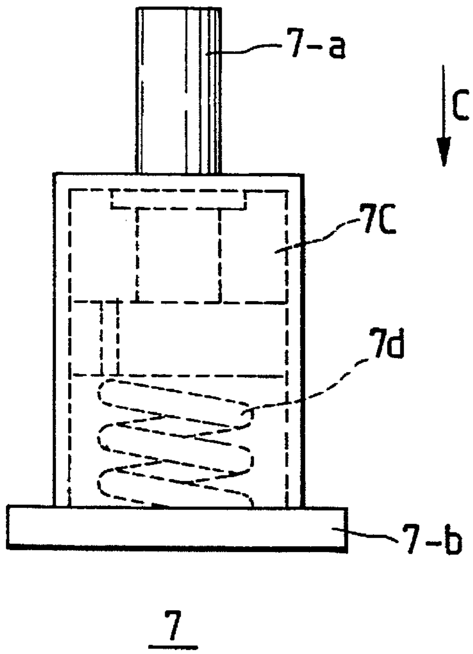
FIG. 4 is a detailed view of the damper of the opening-closing mechanism for the automatic original feeding apparatus embodying the present invention.

FIG. 4 shows the damper 7. The damper 7 is a popular oil damper of which the interior is filled with oil 7-c and in which a damper slider 7-a is adapted to move up and down. Also, design is made such that when a force in the direction of arrow C is applied to the damper slider 7-a, resistance works. Usually, in the initial state, the damper slider 7-a is most protruded by a spring 7-d in the damper, as shown in FIG. 4. Also, the compression spring 5 of the hinge is adapted to rest on a lower flange portion 7-b.

Figure 5A:
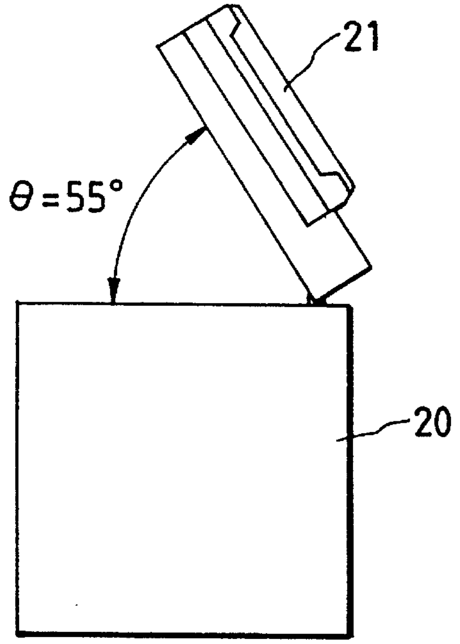
FIGS. 5A and 5B are side views when the opening-closing angle of the opening-closing mechanism for the automatic original feeding apparatus embodying the present invention is 55°.
Figure 5B:
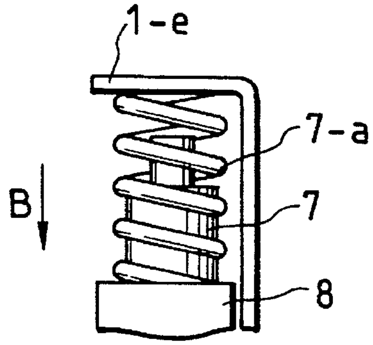

FIG. 5A is a view when the opening-closing angle θ of the automatic original feeding apparatus shown in FIG. 3 is 55°, and FIG. 5B shows the then state of the interior of the hinge.

This state is a position in which, as previously described, the slider 8 has most moved in the direction of arrow B, and the tip end portion of the damper slider 7-a is at a position spaced apart from the bent portion 1-e of the hinge frame 1.

Figure 6A:
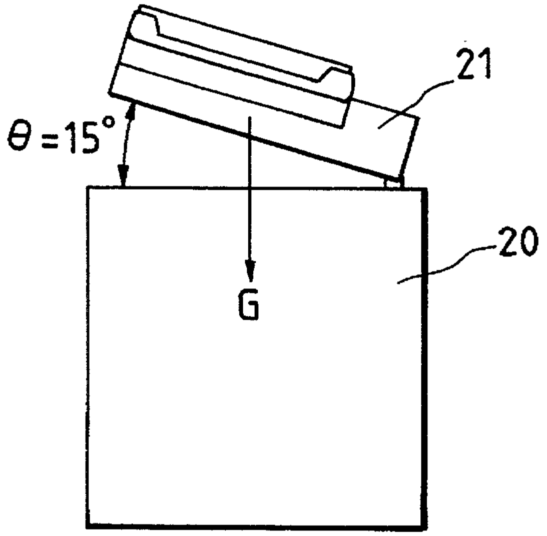
FIGS. 6A and 6B are side views when the opening-closing angle of the opening-closing mechanism for the automatic original feeding apparatus embodying the present invention is 15°.
Figure 6B:
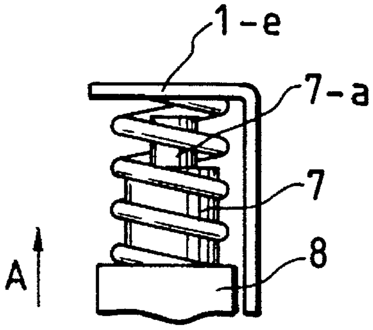

FIG. 6A is a view when the opening-closing angle θ=15°, and FIG. 6B shows the then state of the interior of the hinge.

In this state, the slider 8 moves more in the direction of arrow A than when θ=55°. Also, the tip end portion of the damper slider 7-a is still at a position spaced apart from the bent portion 1-e.

Also, when the automatic original feeding apparatus is closed any further. (θ<15°), there is brought about a positional relation in which the dropping force G by the gravity of the automatic original feeding apparatus overcomes the raising force in the direction of arrow X by the action of the compression springs 5 and 6 described in connection with FIG. 2 and therefore, the automatic original feeding apparatus becomes naturally closed (θ=0°).

On the other hand, when the automatic original feeding apparatus is opened any further (15°≦θ<55°), the dropping force G becomes smaller than the raising force in the direction of arrow X and besides, due to the friction or the like of the mechanism portion, in the position wherein 15°≦θ<55°, the respective opening-closing angles can be maintained.

That is, 15°<θ<55° is a free stop area and θ=15° is a free stop position.

Figure 7A:
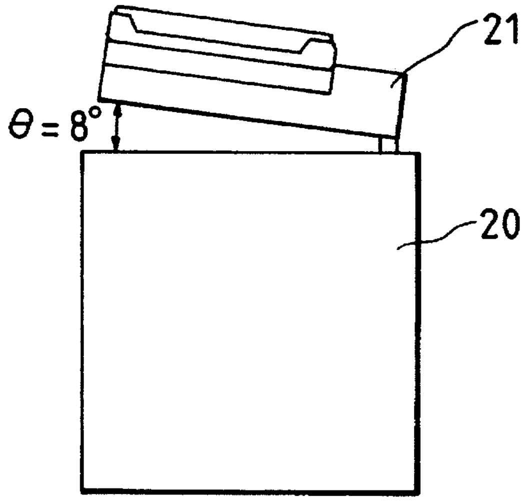
FIGS. 7A and 7B are side views when the opening-closing angle of the opening-closing mechanism for the automatic original feeding apparatus embodying the present invention is 8°.
Figure 7B:
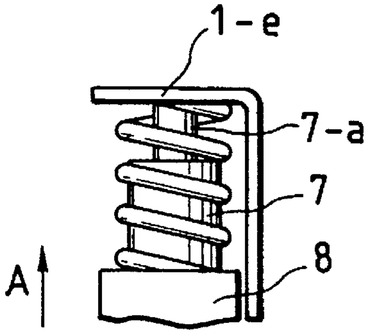

FIG. 7A shows a position in which the automatic original feeding apparatus has been further closed, that is, the opening-closing angle θ=8°, and FIG. 7B shows the then state of the interior of the hinge.

In this state, the slider 8 moves more in the direction of arrow A than when θ=15° and the tip end portion of the damper slider 7-a bears against the bent portion 1-e of the hinge frame 1.

That is, at θ=8°, the damper begins to operate, and at θ<8°, a resistance force opposite to the direction in which the automatic original feeding apparatus is closed is created.

For example, when the automatic original feeding apparatus is gradually closed from the free stop position θ=15°, the dropping speed becomes small at θ=8° and the automatic original feeding apparatus touches down. That is, it quietly lands at the moment when it lands.

On the other hand, when the automatic original feeding apparatus is opened from θ=0°, the resistance force when it is opened is not created because the damper slider 7-a simply bears against the bent portion 1-e. That is, it is only when the automatic original feeding apparatus is closed that the damper 7 operates.

Figure 8:
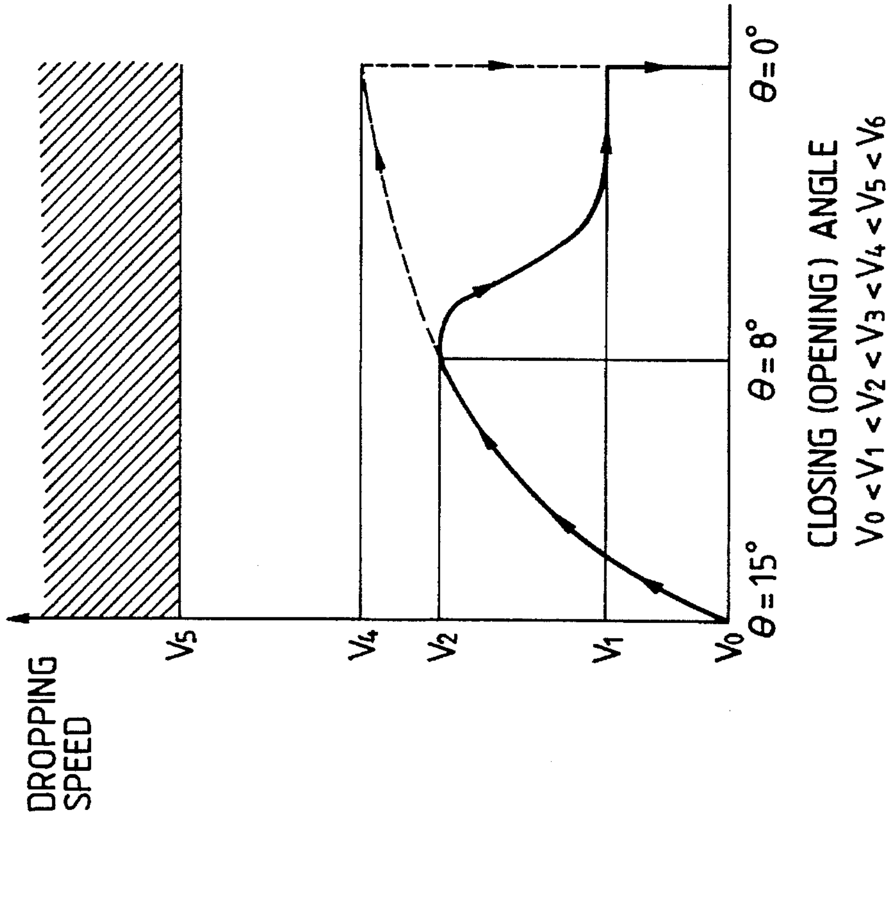
FIG. 8 is a graph showing the dropping speed of the automatic original feeding apparatus embodying the present invention.

FIG. 8 shows the dropping speeds of the rubber leg portion on this side of the automatic original feeding apparatus for respective opening-closing angles when the automatic original feeding apparatus is naturally closed from the free stop position θ=15°. It is to be understood that the speeds are $V_0<V_1<V_2<V_3<V_4<V_5<V_6$.

In the construction of the present embodiment, the speed advances in the direction of solid-line arrow indicated in FIG. 8, and at θ=15°, the speed gradually rises from the initial speed $V_0=0$, and at θ=8°, the speed reaches $V_2$, but as previously described, the resistance force by the damper 7 is created from θ=8° and therefore, the speed suddenly drops and at θ=0° during touching down, the speed drops to $V_1$ and the automatic original feeding apparatus touches down.

On the other hand, when the damper is not mounted, the speed advances in the direction of dotted-line arrow indicated in FIG. 8, and the speed at θ=8° reaches $V_4$ from $V_2$ during touching down.

The hatched area for the speed $V_5$ and greater is a dangerous speed for which if the hatched area is reached when the automatic original feeding apparatus touches down, the platen glass of the copying apparatus against which the rubber leg on this side of the automatic original feeding apparatus bears will be destroyed, and also is a speed for which the automatic original feeding apparatus itself may be damaged by the shock during touching down.

The speed graph shown in FIG. 8 refers to a case where as previously described, the automatic original feeding apparatus is naturally closed from the position of θ=15° and therefore, as shown, it will be seen that the dangerous speed is not reached even if the damper 7 is not mounted.

Figure 9:
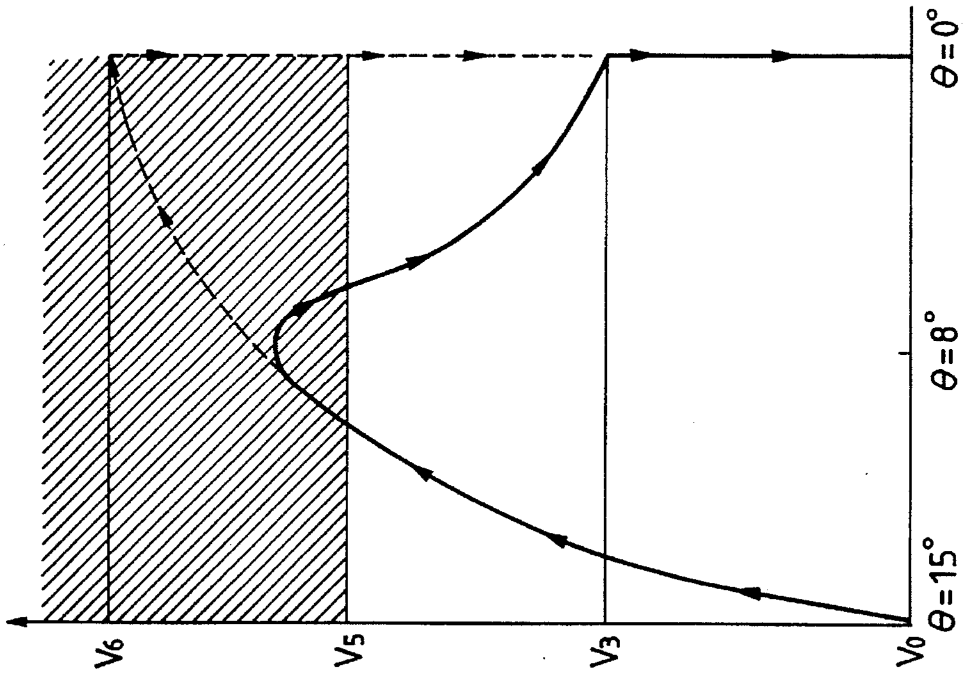
FIG. 9 is a graph showing the dropping speed of the automatic original feeding apparatus embodying the present invention.

However, when the user forcibly closes the automatic original feeding apparatus with an intentional force, the speed graph as shown in FIG. 9 will be assumed.

As in FIG. 8, in the construction of the present embodiment, the speed advances in the direction of solid-line arrow and the automatic original feeding apparatus is closed with an intentional force and therefore, the speed rises suddenly and reaches the dangerous speed area at θ=8°, but due to the resistance force by the damper 7, the speed drops to $V_3$ during touching down at θ=0° and the automatic original feeding apparatus can be deviated from the dangerous speed area.

On the other hand, when the damper is not mounted, the speed reaches $V_6$ during touching down and may destroy the platen glass or the automatic original feeding apparatus.

Also, the automatic original feeding apparatus is used in its closed state as shown in FIG. 2, and only when an original is to be manually placed on the platen and copied without the automatic original feeding apparatus being used, the automatic original feeding apparatus is opened. Actually, manual copying is rare and the copying apparatus is often used with the automatic original feeding apparatus closed, that is, it is often the case that stress remains applied to the compression springs 5 and 6 in the hinge. Therefore, in the worst case, the compression springs 5 and 6 become unable to display their original spring forces and the aforedescribed raising force in the direction of arrow X becomes small, and in some cases, the dropping speed becomes great.

Even in such cases, the platen glass or the automatic original feeding apparatus can be prevented from being destroyed because the damper 7 is mounted.

While the above embodiment has been described with respect to a copying apparatus, the present invention is also applicable to an original reading apparatus. The present invention can be applied not only to the automatic original feeding apparatus, but also to an opening-closing device for an original pressing plate for pressing an original placed on the original supporting table of an original reading apparatus.

As described above, a damper is provided in the opening-closing mechanism for the automatic original feeding apparatus, whereby when the automatic original feeding apparatus is closed, the dropping speed at which the automatic original feeding apparatus lands on the platen glass can be suppressed to thereby prevent the destruction of the platen glass or the automatic original feeding apparatus.

Second Embodiment

Figure 12:
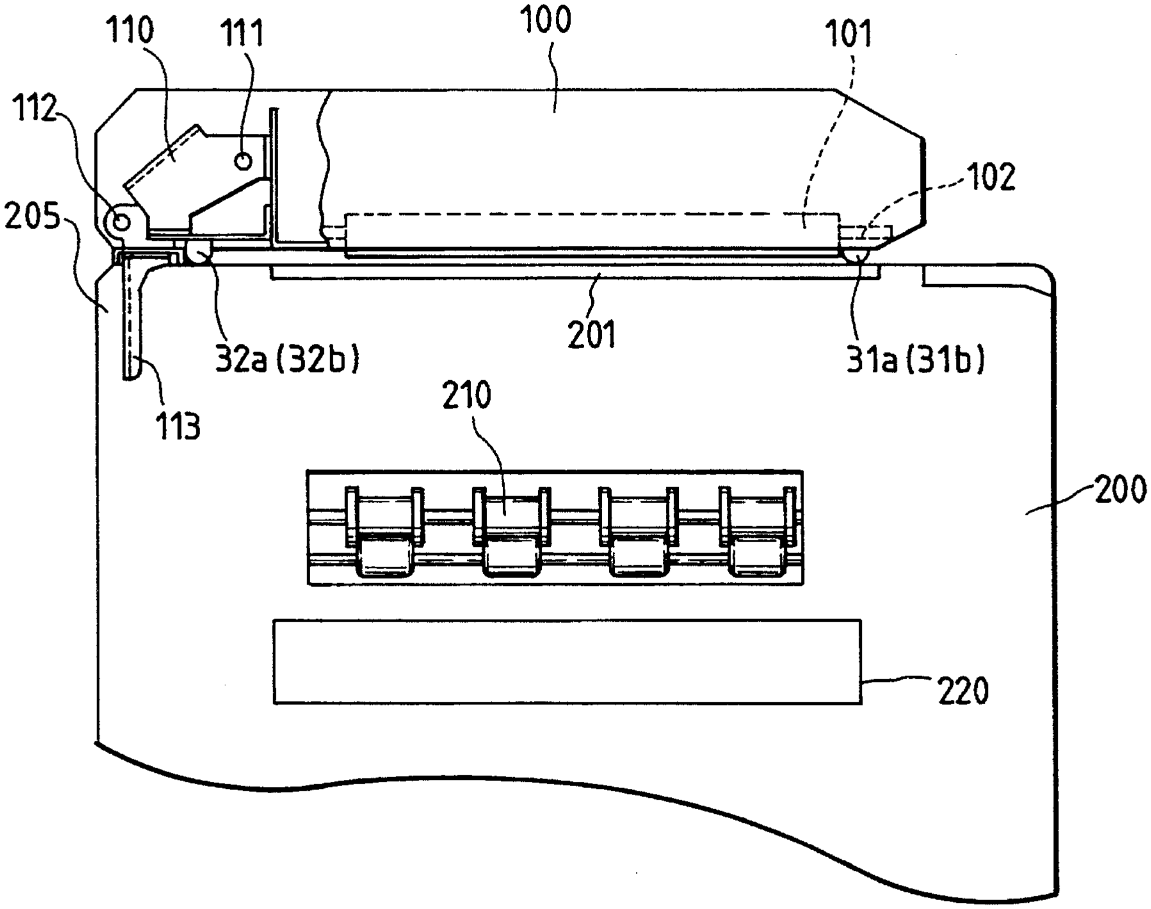
FIG. 12 is a left side view of an image forming apparatus provided with an automatic original feeding apparatus (in its closed state) according to the present invention.
Figure 13:
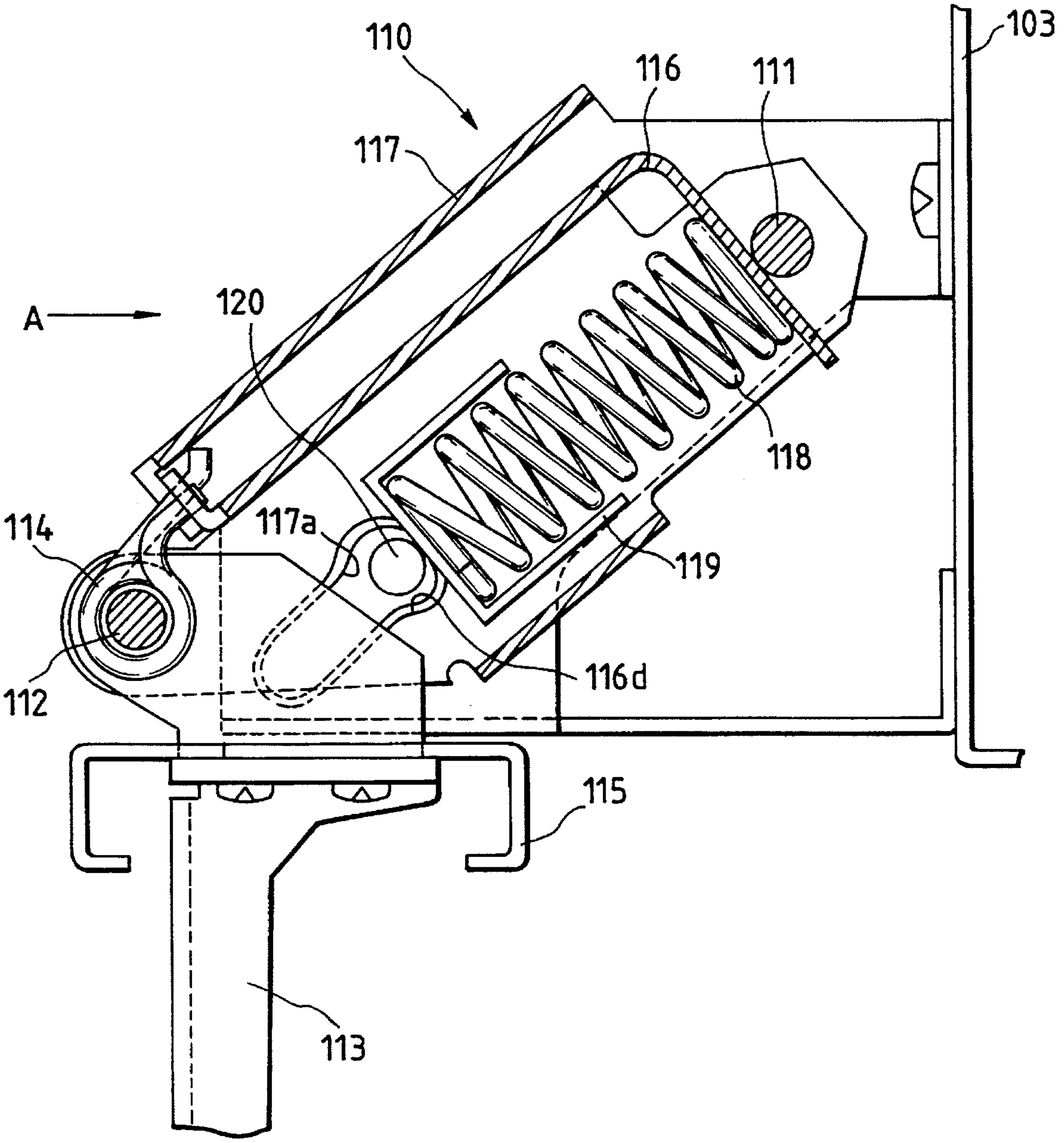
FIG. 13 is an enlarged left side cross-sectional view showing the hinge portion (supporting portion) of the automatic original feeding apparatus of FIG. 12 (in its closed state).
Figure 14:
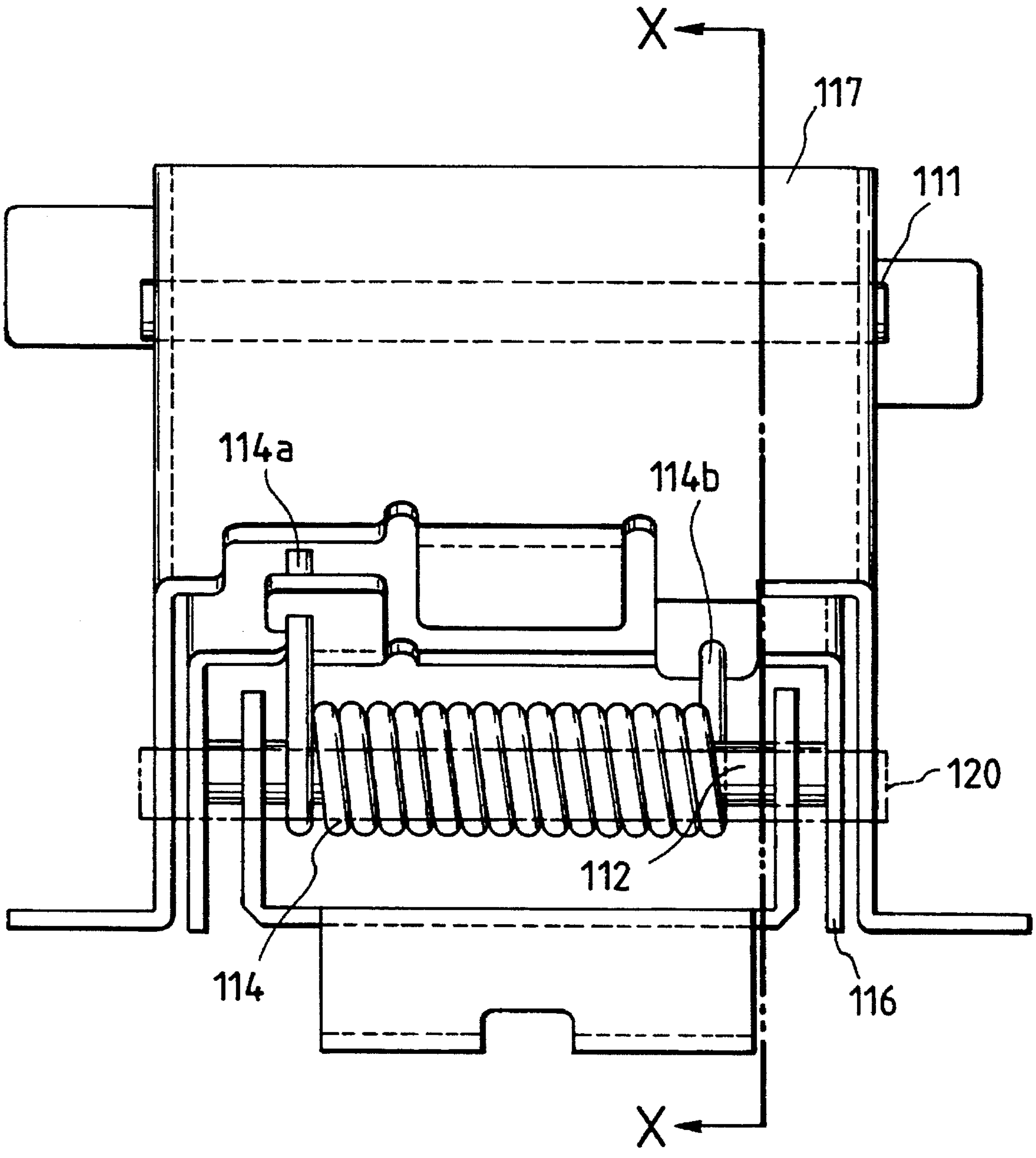
FIG. 14 is a view taken along the arrow A of FIG. 13 (a rear view).

FIG. 12 is a cross-sectional view of an automatic original feeding apparatus 100 which is a second embodiment of the present invention, a support member 110 mounted on the automatic original feeding apparatus 100, and an image forming apparatus 200. FIG. 13 is a detailed cross-sectional view (a cross-section along the line X—X of FIG. 14) of the support member 110. FIG. 14 is a rear view (a view along the arrow A of FIG. 12) of the support member 110.

Figure 15:
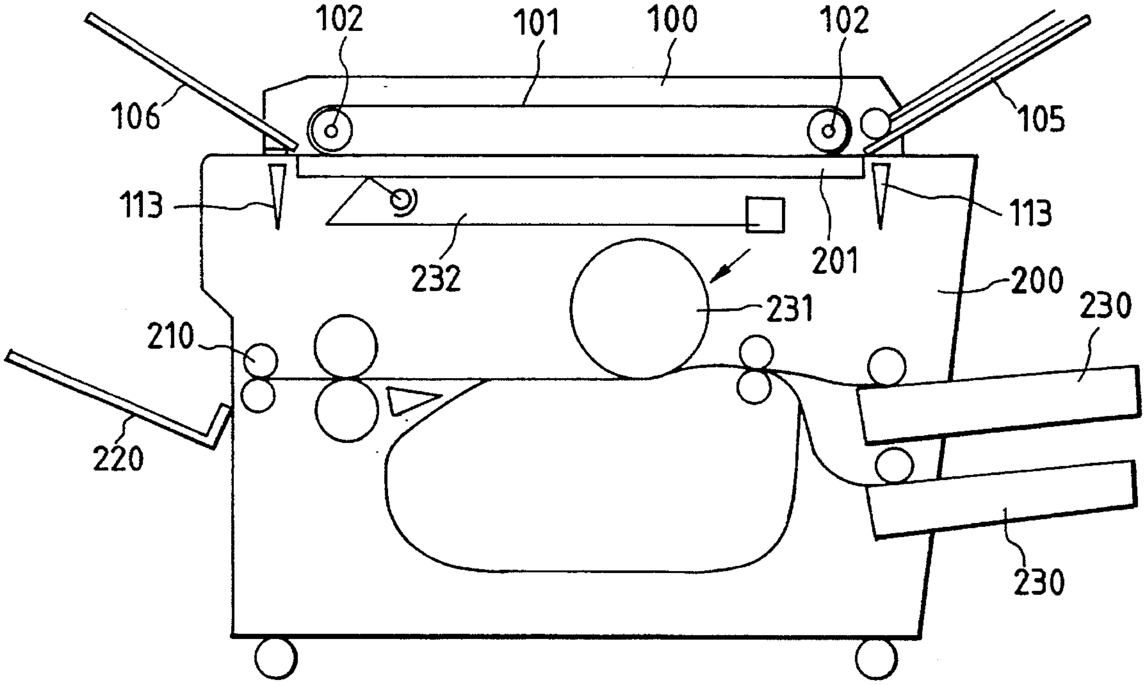
FIG. 15 is a front cross-sectional view of the image forming apparatus of FIG. 12.

The automatic original feeding apparatus 100 having the support member 110 mounted thereon is removably held in such a manner that the hinge leg 113 of the support member 110 is inserted in an aperture 205 formed in the upper surface of the image forming apparatus 200. That is, the automatic original feeding apparatus 100 is pivotally movable within an angle range of about 90° with respect to the image forming apparatus 200 through the support member 110. Accordingly, when the copying operation is to be performed with an original automatically continuously read by the automatic original feeding apparatus 100 relative to the platen glass 201 of the image forming apparatus 200, the reading and copying of the original are effected with the automatic original feeding apparatus 100 closed, and when a thick original such as a book is to be copied, the automatic original feeding apparatus is once opened with respect to the platen glass 201 and the original is set on the platen glass, whereafter the automatic original feeding apparatus 100 is closed again, and the reading and copying of the original are effected. In FIG. 12, the reference numeral 101 designates an original conveying belt, and the reference numeral 102 denotes a rotatable pulley shaft for supporting the belt. The reference numeral 210 designates the sheet discharging roller of the image forming apparatus, and the reference numeral 220 denotes a discharge tray. FIG. 15 is a front view of the entire construction. In FIG. 15, the reference numeral 230 designates cassettes, the reference numeral 231 denotes a photosensitive drum, and the reference numeral 232 designates a reading optical system.

The construction of the support member 110 which is an embodiment of the present invention will now be described with reference to FIGS. 13, 14 and 16–19. FIGS. 16–19 show each member for the description of FIG. 13.

The support member 110 comprises a hinge leg 113, a hinge leg bracket 115, an inner metal sheet 116, an outer metal sheet 117, resilient members 118, 114, a resilient member holder 119, a shaft 111 for restraining the inner metal sheet 116 and the outer metal sheet 117, a shaft 112 for restraining the hinge leg bracket 115 and the inner metal sheet 116, and a cam shaft 120 for regulating the movement of the inner metal sheet 116 and the outer metal sheet 117, and the outer metal sheet 117 is formed with a cam slot 117*a* so as to correspond to the cam shaft 120.

The support member 110 will hereinafter be described in greater detail.

Figure 16:
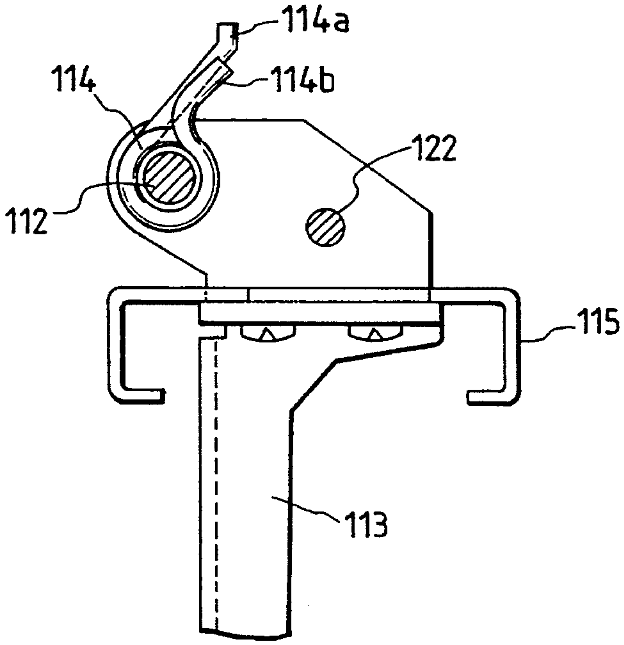
FIG. 16 is a fragmentary view abstracted from FIG. 13.

As shown in FIG. 16, shafts 112 and 122 are fixed to the upper portion of the hinge leg 113, and an aperture 116*b* in the inner metal sheet 116 is fitted on the shaft 112. The inner metal sheet 116 is supported by this shaft 112 and is turnable. On the other hand, a lever 121 forming a slot 121*a* is turnably supported on the shaft 122. A cam shaft 120 extends through the cam slot 117*a*.

Figure 19:
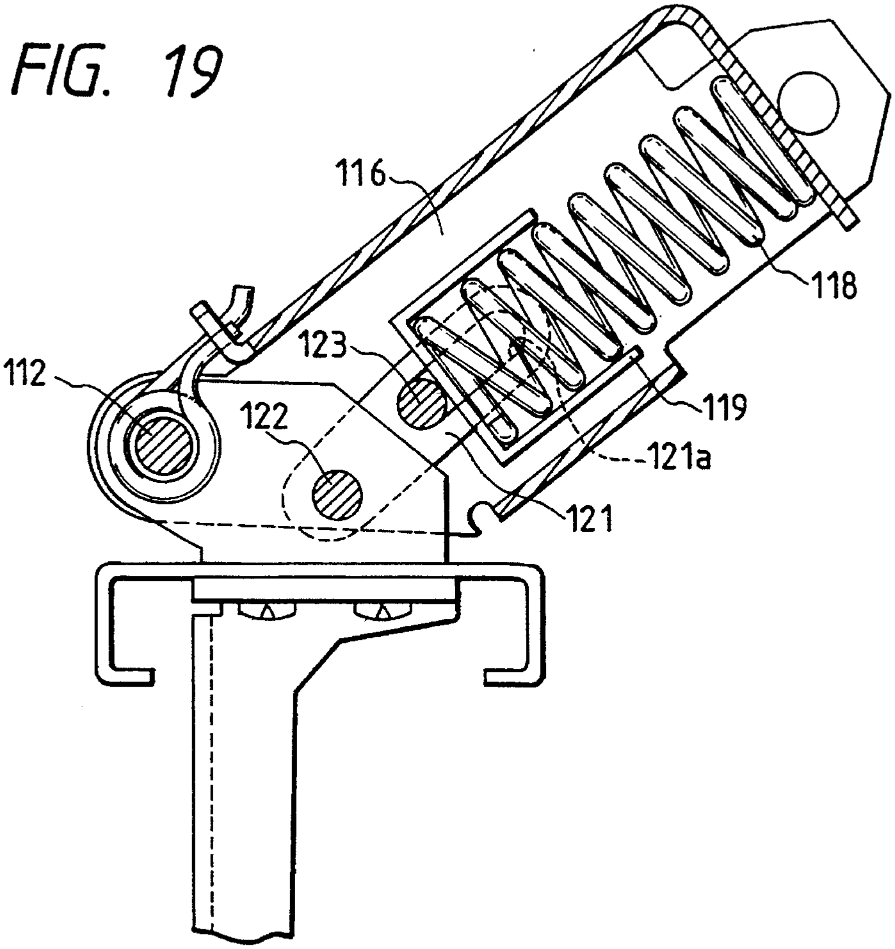
FIG. 19 is a fragmentary view abstracted from FIG. 13.
Figure 20:
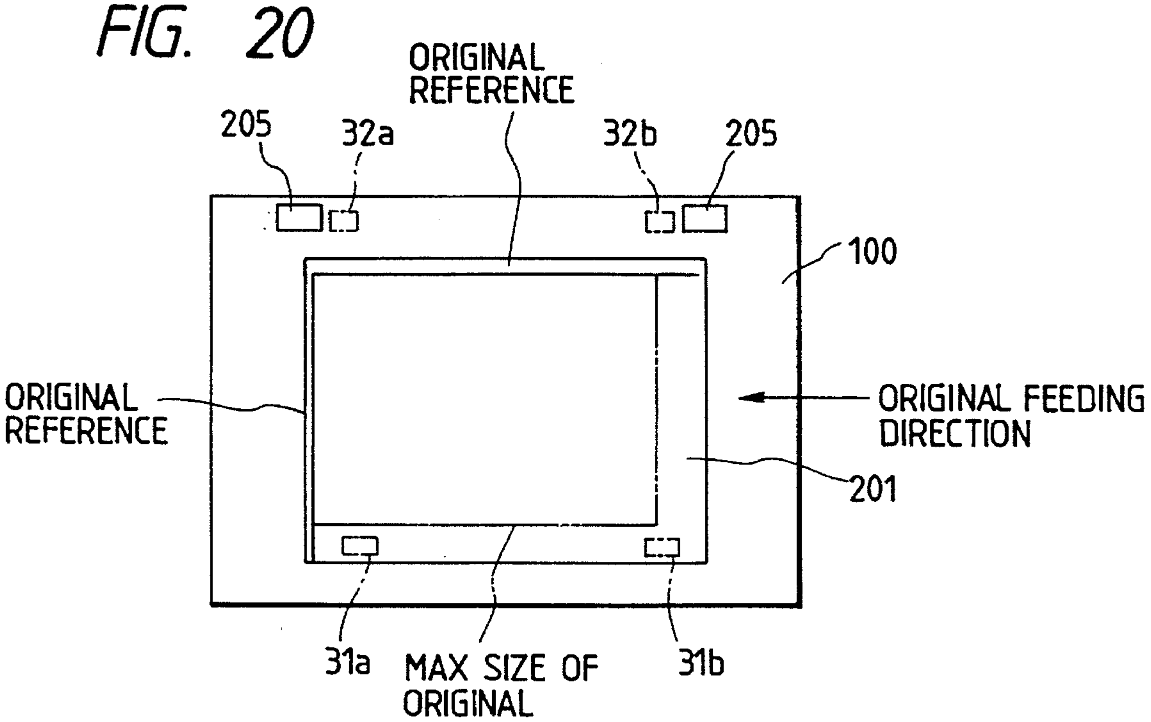
FIG. 20 is a plan view showing the positions of landing legs.

The inner metal sheet 116 is formed with an aperture 116*a*, a spring receiving portion 116*a* and an escape slot 116*d*, and a compression torsion coil spring 118 is contained between the holder 119 and the spring receiving portion 116*c*. The stretch of this spring 118 is checked by the cam shaft 120, as shown in FIG. 19.

Accordingly, the inner metal sheet 116 is turnable about the shaft 112 and is given a leftwardly turning force by the spring 118. As the inner metal sheet 116 is turned leftwardly about the shaft 112 from the state of FIG. 19, the cam shaft 120 is turned leftwardly about the shaft 122 and thus, the coil spring 118 stretches (weakens) gradually.

Figure 17:
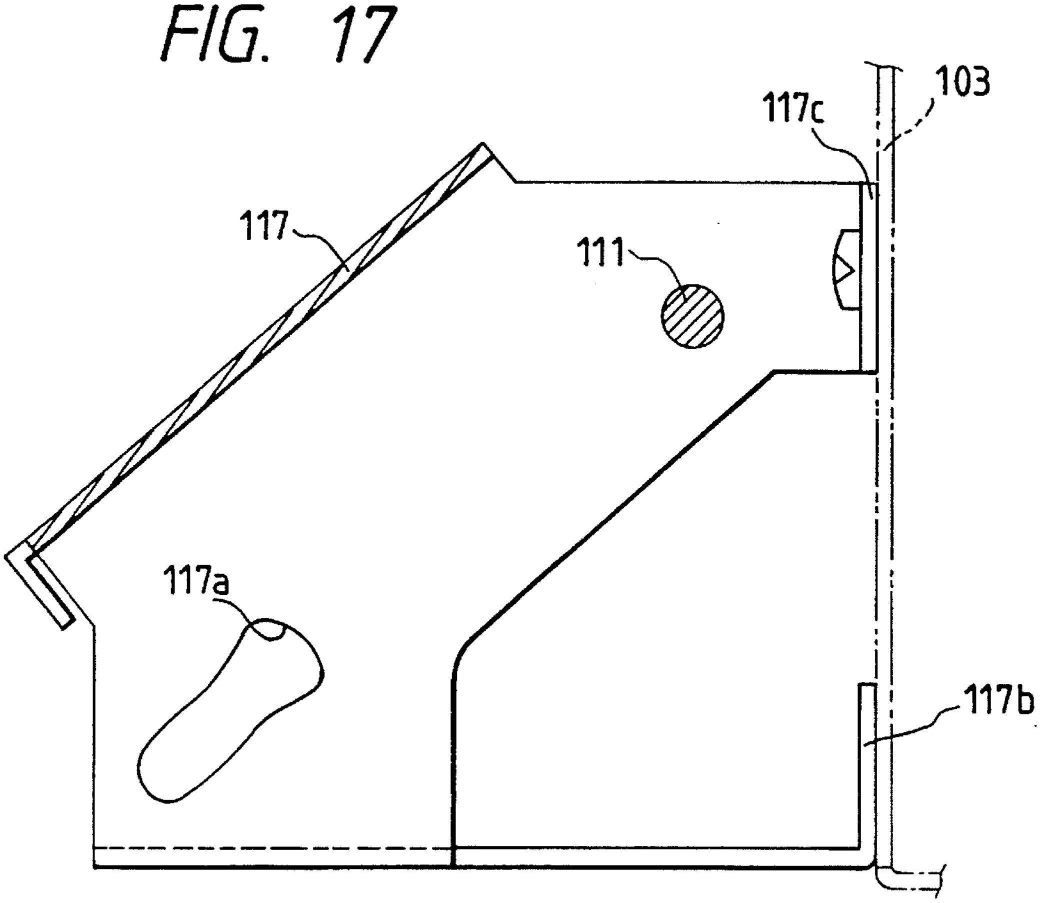
FIG. 17 is a fragmentary view abstracted from FIG. 13.
Figure 18:
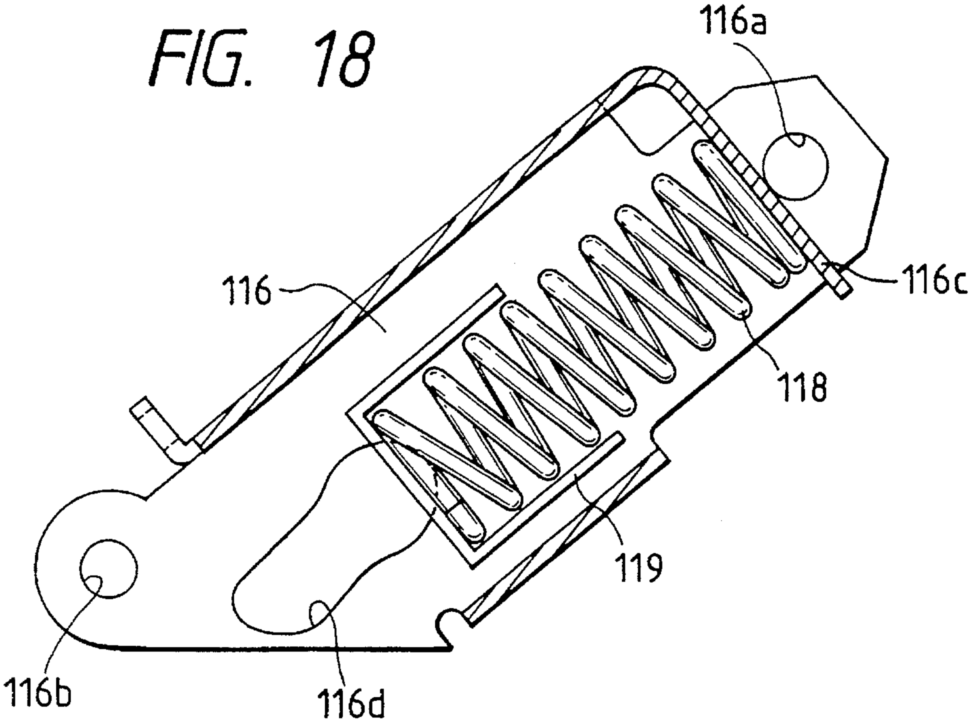
FIG. 18 is a fragmentary view abstracted from FIG. 13.

The outer metal sheet 117, as shown in FIG. 17, has a shaft 111 fixed thereto and is formed with a cam slot 117*a* and bent portions 117*c* and 117*d*. These bent portions 117*c* and 117*d* fix the frame 103 of the automatic original feeding apparatus 100 and support the body of the apparatus 100. The outer metal sheet 117 is turnably supported in the aperture 116*a* in the inner metal sheet 116 by the shaft 111, and is given a force in a direction toward the inner metal sheet 116 (the leftward direction about the shaft 111) by a torsion coil spring 114. The torsion coil spring 114 is wound around the shaft 112, and one end 114*a* thereof is engaged with the inner metal sheet 116 and the other end 114*b* thereof is engaged with the outer metal sheet 117.

Accordingly, the inner metal sheet 116, the outer metal sheet 117 and the frame 103 are turnable as a unit about the shaft 112 and moreover, the outer metal sheet 117 and the frame 103 are turnable (pivotable) about the shaft 111 relative to the inner metal sheet 116.

Description will now be made of the movement of the automatic original feeding apparatus 100 and the support member 110 relative to the image forming apparatus 200.

The positional relationship between the image forming apparatus 200 and the automatic original feeding apparatus 100 need usually be such that in order to effect the stable reading operation, the four contacting legs (front legs 31*a*, 31*b* and inner legs 32*a*, 32*b*) of the automatic original feeding apparatus 100 are always uniformly in contact with the platen glass 201 of the image forming apparatus 200 or the upper surface of the image forming apparatus 200. Unless this is done, unsatisfactory conveyance by oblique movement may occur when an original is conveyed from the automatic original feeding apparatus 100 onto the platen glass 201 of the image forming apparatus 200. So, in the prior-art apparatus, the height of the hinge leg of the support member 110 mounted on the automatic original feeding apparatus has been delicately adjusted and the automatic original feeding apparatus 100 has been mounted on the image forming apparatus 200. The present invention makes such adjustment as unnecessary as possible.

So, the opening-closing operation of the automatic original feeding apparatus 100 relative to the image forming apparatus 200 when the support member 110 of the present invention has been mounted will now be described with reference to FIGS. 21A and 21B.

When the automatic original feeding apparatus 100 opened (FIG. 21A) above the image forming apparatus 200 is to be closed, the automatic original feeding apparatus 100 is pivotally moved about the shaft 112 which is the first pivotal fulcrum and falls, and as shown in FIG. 21B, the inner legs 32*a* and 32*b* first touch down on the upper surface of the image forming apparatus 200. This is because usually, the resilient member 114 in the support member 110 applies a counter-clockwise force to the outer metal sheet 117 (i.e., the frame 103) relative to the shaft 111.

Subsequently, after the inner legs 32*a* and 32*b* have touched down on the upper surface of the image forming apparatus 200, the automatic original feeding apparatus 100 is pivotally moved about the shaft 111 which is the second pivotal fulcrum and falls, and as shown in FIG. 12, the front legs 31*a* and 31*b* also land on the platen glass 201 of the image forming apparatus and the closing operation is completed.

Thus, design is made such that when the automatic original feeding apparatus is to be closed, as previously described, the inner legs always touch down earlier and thereafter the front legs touch down about the second pivotal fulcrum, whereby even when the mounted position of the automatic original feeding apparatus 100 in the direction of height thereof is somewhat irregular relative to the image forming apparatus 200, the front and inner legs of the automatic original feeding apparatus 100 safely touch down enable the reading operation to be performed.

Figure 22:
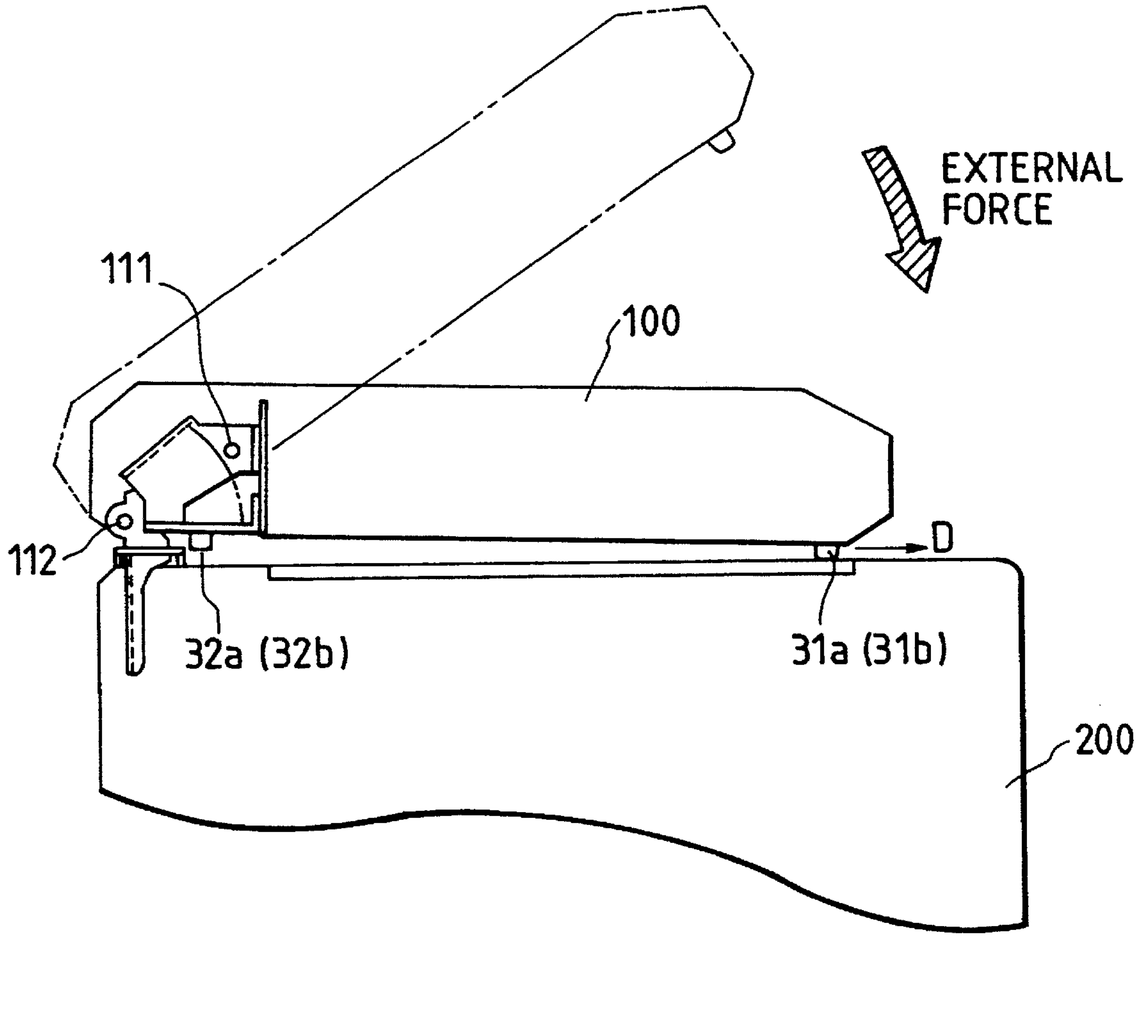
FIG. 22 illustrates the operation of the apparatus of FIG. 12.

The foregoing description regards a case where the automatic original feeding apparatus 100 is dropped onto the image forming apparatus 200 by gravity or at a speed approximate thereto, but when this side of the automatic original feeding apparatus 100 is strongly held down by an external force such as man power or a force is applied to the apparatus 100, the front legs 31*a* and 31*b* touch down earlier on the platen glass 201 of the image forming apparatus 200, as shown in FIG. 22, unlike the aforedescribed state of FIG. 21B.

Even in such a case, because the inner legs 32*a* and 32*b* are disposed on the inner side with respect to the shaft 111 which is the second pivotal fulcrum, the resilient member 114 in the support member 110 applies a counter-clockwise force to the outer metal sheet 117 relative to the shaft 111, whereby the front legs 31*a* and 31*b* slide in the direction of arrow D indicated in FIG. 22 and the inner legs 32*a* and 32*b* touch down on the upper surface of the image forming apparatus 200.

Thus, even when an external force such as man power is applied, the front legs 31*a* and 31*b* touch down, whereafter the front and inner legs can land on the upper surface and platen glass 201 of the image forming apparatus 200 without the support member 110 and the front legs 31*a*, 31*b* stretching against each other and it becomes possible to stably effect the conveyance of the original by the automatic original feeding apparatus 100. The inner side priority touching down in which the reference side is earlier held down is more advantageous.

FIGS. 23A to 23E show the pivotally moved states of the outer metal sheet 117 and shaft 111 by the opening-closing angle relative to the platen of an original processing apparatus. In these figures, $l_1>l_2>l_3>l_4>l_5$.

The cam slot 117*a* is a cam-shaped slot for regulating the outer metal sheet 117 so as not to pivotally move about the shaft 111 by a predetermined amount or greater.

Figure 23A:
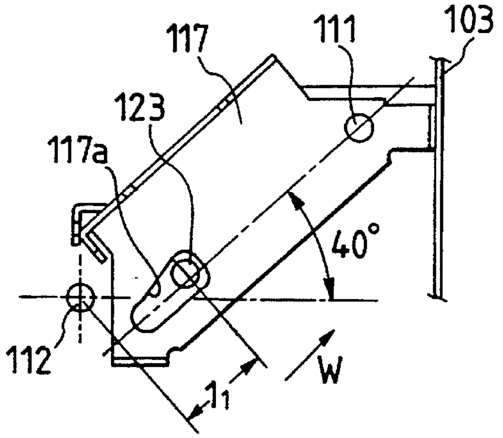
FIGS. 23A to 23E illustrate the movement of a cam shaft 120.
Figure 23B:
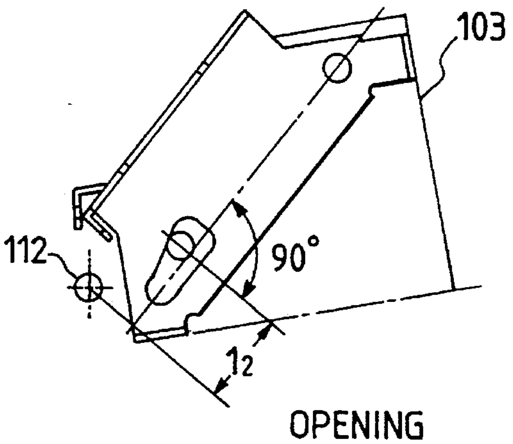
Figure 23C:
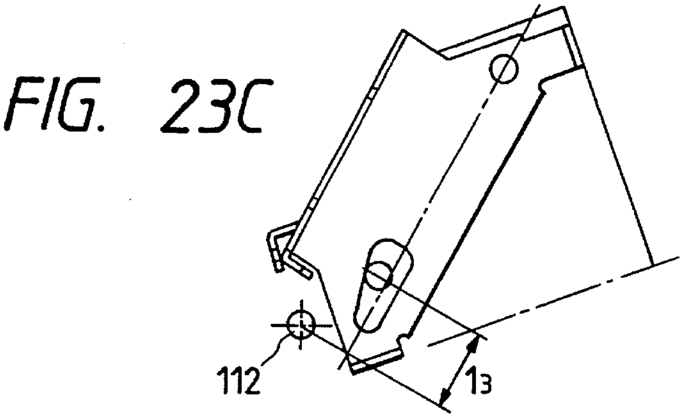
Figure 23D:
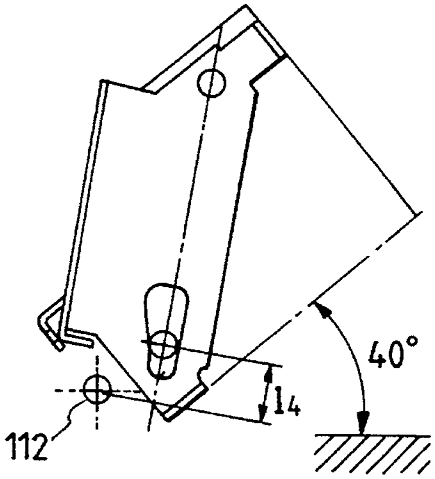
Figure 23E:
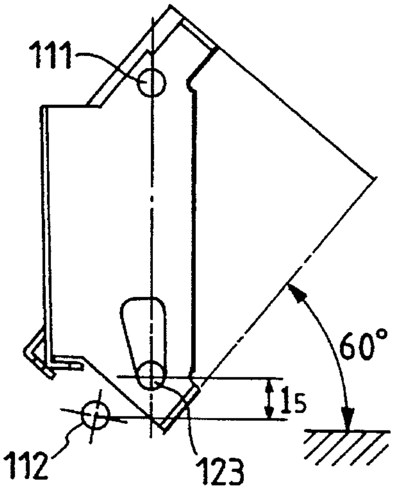

The cam shaft 120, as shown in FIGS. 23A to 23E, shifts in the direction of arrow w (relative to the shaft 112) as the original processing apparatus is closed (approximates 0°), and assumes the state of FIG. 23A. The movement of the shaft 120 in the direction of arrow w is utilized so that when the original processing apparatus has been closed (0°), a maximum pivotal movement angle (of the outer metal sheet 117 about the shaft 111 may be obtained. That is, when the original processing apparatus has been closed, maximum height absorption (adjustless function) becomes possible. Heretofore, there has only been a member corresponding to the shaft 112 and the height of this member has been adjusted.

Within the opening-closing range (of the original processing apparatus), the outer metal sheet 117 is subjected to a counter-clockwise moment relative to the shaft 111 and therefore, when the apparatus is opened, the relation between the cam shaft 120 and the cam slot 117*a* changes as shown in FIGS. 23A to 23E. When the apparatus is in its closed state (FIG. 23A), the distance between the shaft 123 and the shaft 111 is shortest and therefore the coil spring 118 is strongest (great in its opening force). Accordingly, when the apparatus body which is heaviest in its horizontal state is raised, the operator only requires a small force. On the other hand, when the apparatus is in its opened state (FIG. 23E), the distance between the shaft 111 and the shaft 120 is long and therefore the coil spring 118 stretches and its spring force becomes weak. Accordingly, any unnecessary turning force does not act, but is balanced with the gravity of the apparatus body, whereby the apparatus body can be stopped and held in a stageless manner.

Figure 24A:
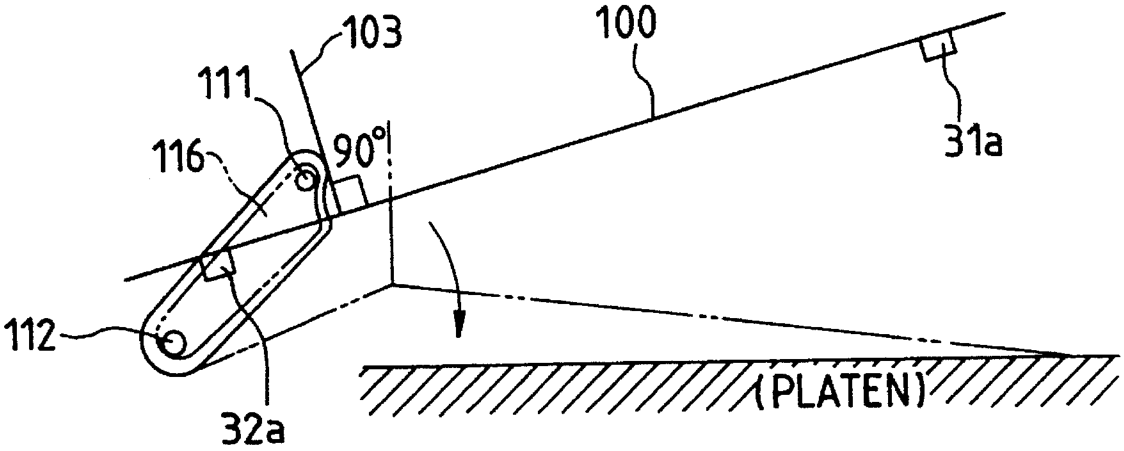
FIGS. 24A and 24B illustrate front priority touchdown and inner priority touchdown.
Figure 24B:
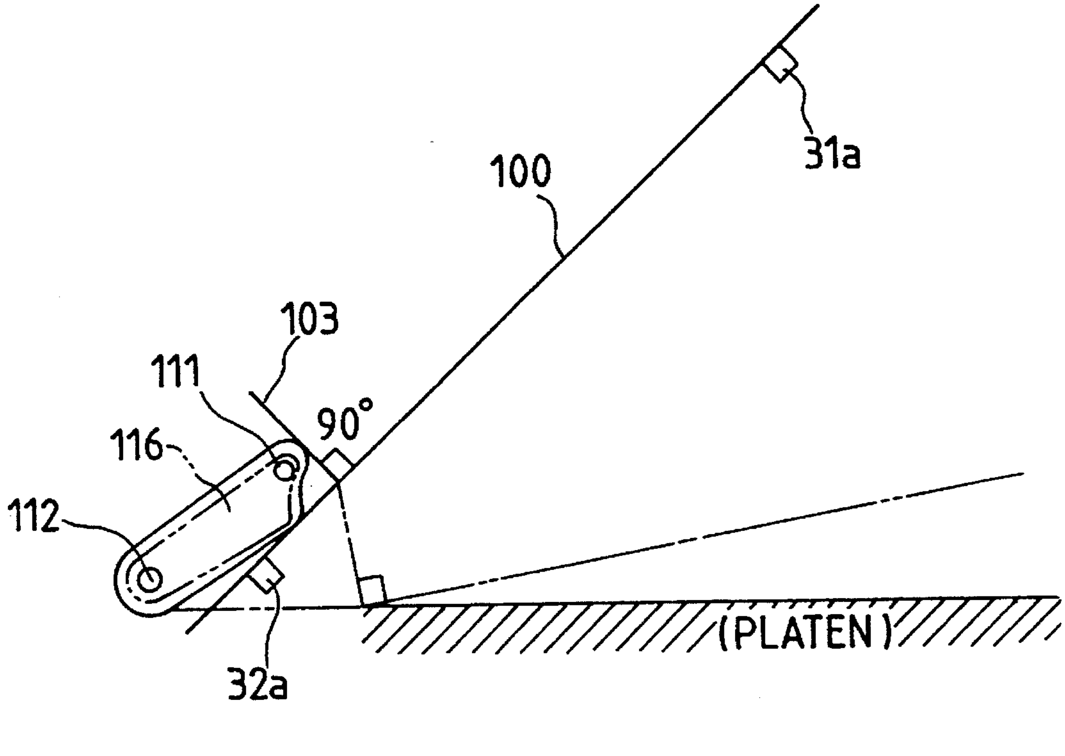

FIGS. 24A and 24B show the states of the inner metal sheet 116 and the original processing apparatus 100 (fixed to the outer metal sheet 117) during touching down. FIG. 24A shows the state of front priority touching down, and FIG. 24B shows the state of rear priority touching down. That is, in the movement shown in these figures and FIG. 23, the outer metal sheet 117 is regulated in its pivotal movement counter-clockwisely relative to the shaft 111 within the range of the regulation of the cam shaft 111 and the cam slot 117*a* and therefore, inner side priority landing becomes possible as shown in FIG. 22.

Figure 25:
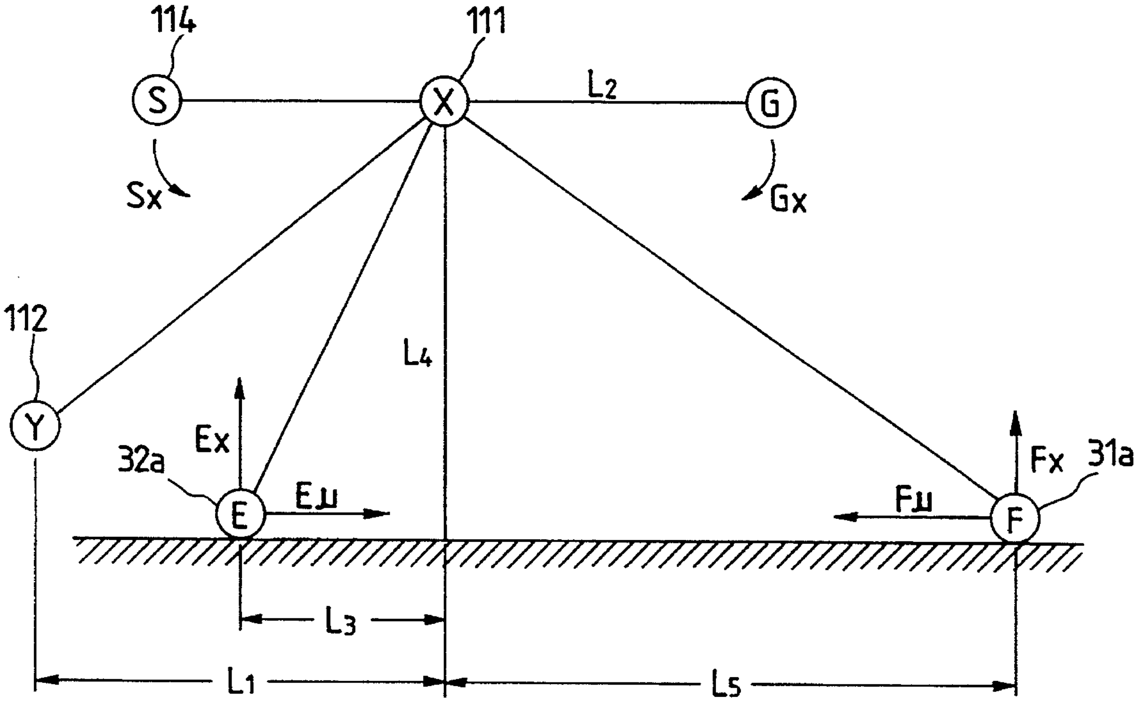
FIG. 25 show the relation between forces during landing.

The relation between the forces when the usual touching down state of the aforedescribed automatic original feeding apparatus 100 is considered will now be described on the basis of the force acting diagram of FIG. 25.

Y: the first pivotal fulcrum (shaft 112) of the automatic original feeding apparatus;

X: the second pivotal fulcrum (shaft 111) of the automatic original feeding apparatus;

G: the centroid of the automatic original feeding apparatus;

S: the resilient member (resilient member 114) of the support member;

E: the inner side touchdown point (inner legs 32*a*, 32*b*) of the automatic original feeding apparatus;

F: the front side touchdown point (front legs 31*a*, 31*b*) of the automatic original feeding apparatus;

L1–L5: the distances between the respective members.

When the moment of the force at the point X is considered, $$S_{(x)}>G_{(x)} \quad (1)$$

$$S_{(x)}+E\mu<G_{(x)}+E_{(x)} \quad (2)$$

and it is necessary to satisfy inequalities (1) and (2) above.

Also, when the front side is strongly pushed by man power (when the front side touches down earlier as shown in FIG. 22), it is necessary to satisfy the following inequality as well:

$$S_{(x)}+F_{(x)}>G_{(x)}+F\mu \quad (3)$$

Accordingly, by satisfying inequalities (1), (2) and (3) above and disposing the inner leg 32*a* on the inner side with respect to the second pivotal fulcrum 111, it becomes possible to install the automatic original feeding apparatus 100 stably on the image forming apparatus 200 not only usually but also when the opening-closing operation of the automatic original feeding apparatus 100 is performed under an external force.

As described above, the automatic original feeding apparatus is mounted on the image forming apparatus by means of the support member having the first pivotal fulcrum for pivotally moving the automatic original feeding apparatus from the upper surface of the image forming apparatus and opening and closing the automatic original feeding apparatus and the second pivotal fulcrum for holding the automatic original feeding apparatus substantially in parallelism to the upper surface of the image forming apparatus, and the inner touchdown point of the automatic original feeding apparatus is provided on the inner side with respect to the second pivotal fulcrum of the support member, whereby even when some machine body difference or the like occurs in the direction of height when the automatic original feeding apparatus is mounted on the image forming apparatus, it is possible to ensure the automatic original feeding apparatus to be along the upper surface of the image forming apparatus and also, it becomes possible to install the automatic original feeding apparatus in a stable state even when the automatic original feeding apparatus is forced to be opened or closed on the image forming apparatus by an external force. Accordingly, a serviceman can install the automatic original feeding apparatus without doing any special adjusting work when be mounts the automatic original feeding apparatus on the image forming apparatus and thus, it becomes possible to facilitate the installing work and decrease the time and labor required for the installation.

In the above-described embodiments, there has been shown an example in which the automatic original feeding apparatus, including the original supporting table 105 and the discharge tray 106, is opened and closed, whereas the present invention is not restricted thereto. For example, design may be made such that only the conveying belt 101 can be opened and closed with the original supporting table 105 and the discharge tray 106 left. If at least the conveying belt 101 is opened and closed, it will be possible to place an original on the platen.

Also, in the above-described embodiments, four touching down legs are disposed at four corners whereas this is not restrictive, but three landing legs (two legs on this side and one leg at the center of the inner side) may be disposed so as to form a triangle. The locations at which the landing legs are disposed may be the surface of the platen glass or other place than the platen glass.

What is claimed is:

1. An original pressing device in a reading apparatus, said device comprising:

hinge means;

pressing means supported pivotably by said hinge means and pivoting between a closing position where an original on a platen glass is pressed and an opening position where the original is released:

a coil spring compressed with a closing operation of said pressing means and released from the compression with an opening operation of said pressing means; and a fluid damper arranged within a hollow position of said coil spring and providing a resistance force when said pressing means performs closing operation.

2. A device according to claim 1, wherein said pressing means has original feeding means for conveying the original to the original platen glass.

3. A device according to claim 1, wherein said fluid damper creates the resistance force just before the closing operation of said pressing means is completed.

4. A device according to claim 3, wherein a damper slider is adapted to be pressed when the coil spring is compressed to less than a predetermined level.

5. An image forming apparatus comprising:

hinge means:

pressing means supported pivotably by said hinge means and pivoting between a closing position where an original on a platen glass is pressed and an opening position where the original is released:

a coil spring compressed with a closing operation of said pressing means and released from the compression with an opening operation of said pressing means;

a fluid damper arranged within a hollow position of said coil spring and providing a resistance force when said pressing means performs closing operation; and image forming means for forming a read image of the original on a sheet.

6. A device according to claim 5, wherein said pressing means has original feeding means for conveying the original to the original platen glass.

7. A device according to claim 5, wherein said fluid damper creates the resistance force just before the closing operation of said pressing means is completed.

8. A device according to claim 7, wherein a damper slider is adapted to be pressed when the coil spring is compressed to less than a predetermined level.

9. An original pressing device in a reading apparatus, said device comprising:

hinge means;

a holder supported pivotably by said hinge means through a first shaft:

pressing means supported pivotably by said holder through a second shaft and pivoting together with said holder through said first shaft between a closing position where an original on platen glass is pressed and an opening position where the original is released;

first resilience means expanding and contracting with the opening and closing operations of said holder and said pressing means;

second resilience means for exerting a pivotable force onto said pressing means around said second shaft as an axis in a direction toward said holder;

a first leg portion formed at said pressing means between said first and second shafts; and a second leg portion being in a direction apart from said first shaft with bordering on said second shall and formed at said pressing means.

10. A device according to claim 9, wherein said pressing means has original feeding means for conveying the original to the original platen glass.

11. A device according to claim 9, wherein said holder is covered by a cover of said pressing means.

12. A device according to claim 9, wherein said first resilience means exerts a three in a releasing direction onto said pressing means, the three being weak when released and strong when in the closing position, and the force of the first resilience means and a dead weight of the pressing means balancing.

13. A device according to claim 9, wherein the leg portions are four in total.

14. A device according to claim 9, wherein said first leg portion is in a position near the first shaft and apart from the platen glass, and said second leg portion is in a position apart from the first and second shafts and opposite to the platen glass.

15. An image forming apparatus, comprising:

hinge means:

a holder supported pivotably by said hinge means through a first shaft:

pressing means supported pivotably by said holder through a second shaft and pivoting together with said holder through said first shaft between a closing position where an original on platen glass is pressed and an opening position where the original is released;

first resilience means expanding and contracting with the opening and closing operations of said holder and said pressing means:

second resilience means for exerting a pivotable force onto said pressing means around said second shaft as an axis in a direction toward said holder;

a first leg portion formed at said pressing means between said first and second shafts;

a second leg portion being in a direction apart from said first shaft with bordering on said second shaft and formed at said pressing means; and image forming means for forming read image of the original on a sheet.

16. A device according to claim 15, wherein said pressing means has original feeding means for conveying the original to the original platen glass.

17. A device according to claim 15, wherein said holder is covered by a cover of said pressing means.

18. A device according to claim 15, wherein said first resilience means exerts a force in a releasing direction onto said pressing means, the force being weak when released and strong when in the closing position, and the force of the first resilience means and a dead weight of the pressing means balancing.

19. A device according to claim 15, wherein the leg portions are four in total.

20. A device according to claim 15, wherein said first leg portion is in a position near the first shaft and apart from the platen glass, and said second leg portion is in a position apart from the first and second shafts and opposite to the platen glass.

* * * * *

UNITED STATES PATENT AND TRADEMARK OFFICE

CERTIFICATE OF CORRECTION

PATENT NO. : 5,621,501
DATED : April 15, 1997
INVENTOR(S) : Kazuhiro MATSUO, et al.

It is certified that error appears in the above-indentified patent and that said Letters Patent is hereby corrected as shown below:

COVER PAGE
item [56] References Cited, delete "Goshimo" and insert therefor --Goshima--.

COLUMN 1
Line 28, delete "of", second occurrence.

COLUMN 3
Line 43, delete "service" and insert therefor --serviceman--.

COLUMN 10
Line 61, delete "enable" and insert therefor --enabling--.

COLUMN 11
Line 39, after "111", insert a parentheses (")").

COLUMN 14
Lines 35 and 36, delete "three", both occurrences, and insert therefor --force--.

Signed and Sealed this

Eighteenth Day of November 1997

*Attest:*

BRUCE LEHMAN

*Attesting Officer* *Commissioner of Patents and Trademarks*